United States Patent
Kawaoka

(10) Patent No.: US 9,389,914 B2
(45) Date of Patent: Jul. 12, 2016

(54) INFORMATION PROCESSING APPARATUS AND CONTROL METHOD THEREOF

(71) Applicant: CANON KABUSHIKI KAISHA, Tokyo (JP)

(72) Inventor: Shigeo Kawaoka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 284 days.

(21) Appl. No.: 13/912,397

(22) Filed: Jun. 7, 2013

(65) Prior Publication Data

US 2014/0040910 A1  Feb. 6, 2014

(30) Foreign Application Priority Data

Jul. 31, 2012  (JP) ................................. 2012-170375

(51) Int. Cl.
*G06F 9/46* (2006.01)
*G06F 9/50* (2006.01)
*G06F 1/32* (2006.01)

(52) U.S. Cl.
CPC ................ *G06F 9/50* (2013.01); *G06F 1/3206* (2013.01); *G06F 1/3287* (2013.01); *G06F 9/5094* (2013.01); *Y02B 60/1282* (2013.01); *Y02B 60/142* (2013.01)

(58) Field of Classification Search
None
See application file for complete search history.

(56) References Cited

U.S. PATENT DOCUMENTS

| | | | |
|---|---|---|---|
| 5,457,790 A * | 10/1995 | Iwamura ............. | G06F 15/7832 711/167 |
| 5,781,783 A * | 7/1998 | Gunther et al. ............... | 713/320 |
| 8,136,076 B2 | 3/2012 | Bachina et al. ............... | 716/126 |
| 8,595,670 B1 * | 11/2013 | Tse et al. ....................... | 716/116 |
| 2003/0052730 A1* | 3/2003 | Hoshi et al. .................... | 327/544 |
| 2005/0060588 A1* | 3/2005 | Araki ............................. | 713/300 |
| 2005/0218943 A1* | 10/2005 | Padhye ............... | G06F 13/4072 327/109 |
| 2007/0038876 A1* | 2/2007 | Berthold et al. .............. | 713/300 |
| 2011/0291691 A1* | 12/2011 | Cho ....................... | G06F 1/3287 324/762.01 |

FOREIGN PATENT DOCUMENTS

| | | |
|---|---|---|
| JP | 2008-097463 | 4/2008 |
| JP | 2010-211496 | 9/2010 |
| JP | 2010-226524 | 10/2010 |
| WO | 2008/026731 A | 3/2008 |

\* cited by examiner

*Primary Examiner* — Kenneth Tang
(74) *Attorney, Agent, or Firm* — Fitzpatrick, Cella, Harper & Scinto

(57) ABSTRACT

Each of a plurality of circuit blocks includes a plurality of arithmetic elements. A power supply controller individually controls power supply to each circuit block. A resource management unit acquires first information, regarding an arithmetic element necessary for an arithmetic process, and second information, regarding an arithmetic element included in a circuit block which is currently being supplied with power. Based on the first information and the second information, the resource management unit preferentially assigns, to an arithmetic element included in a circuit block which is being supplied with power, a process for implementing the arithmetic process.

13 Claims, 19 Drawing Sheets

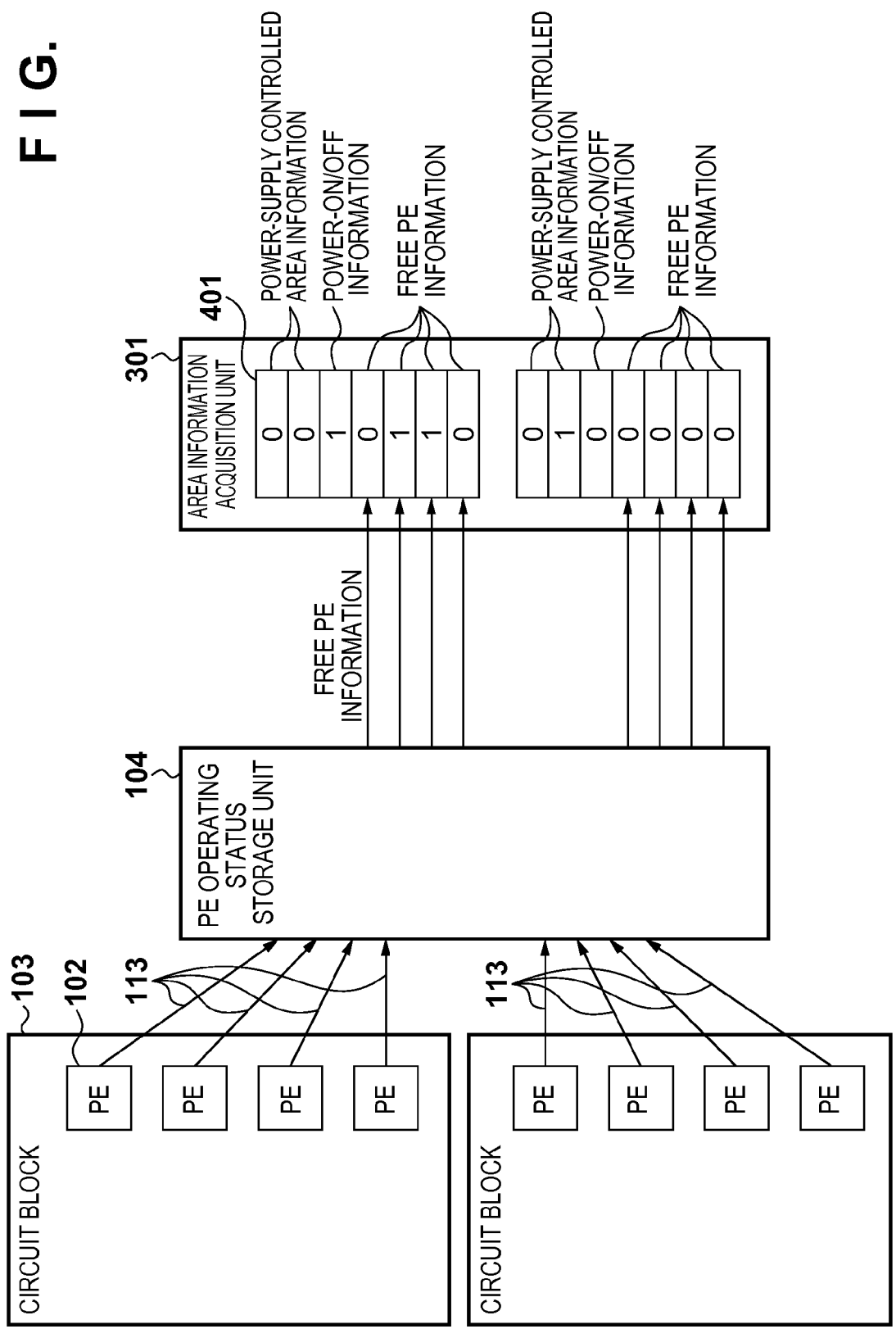

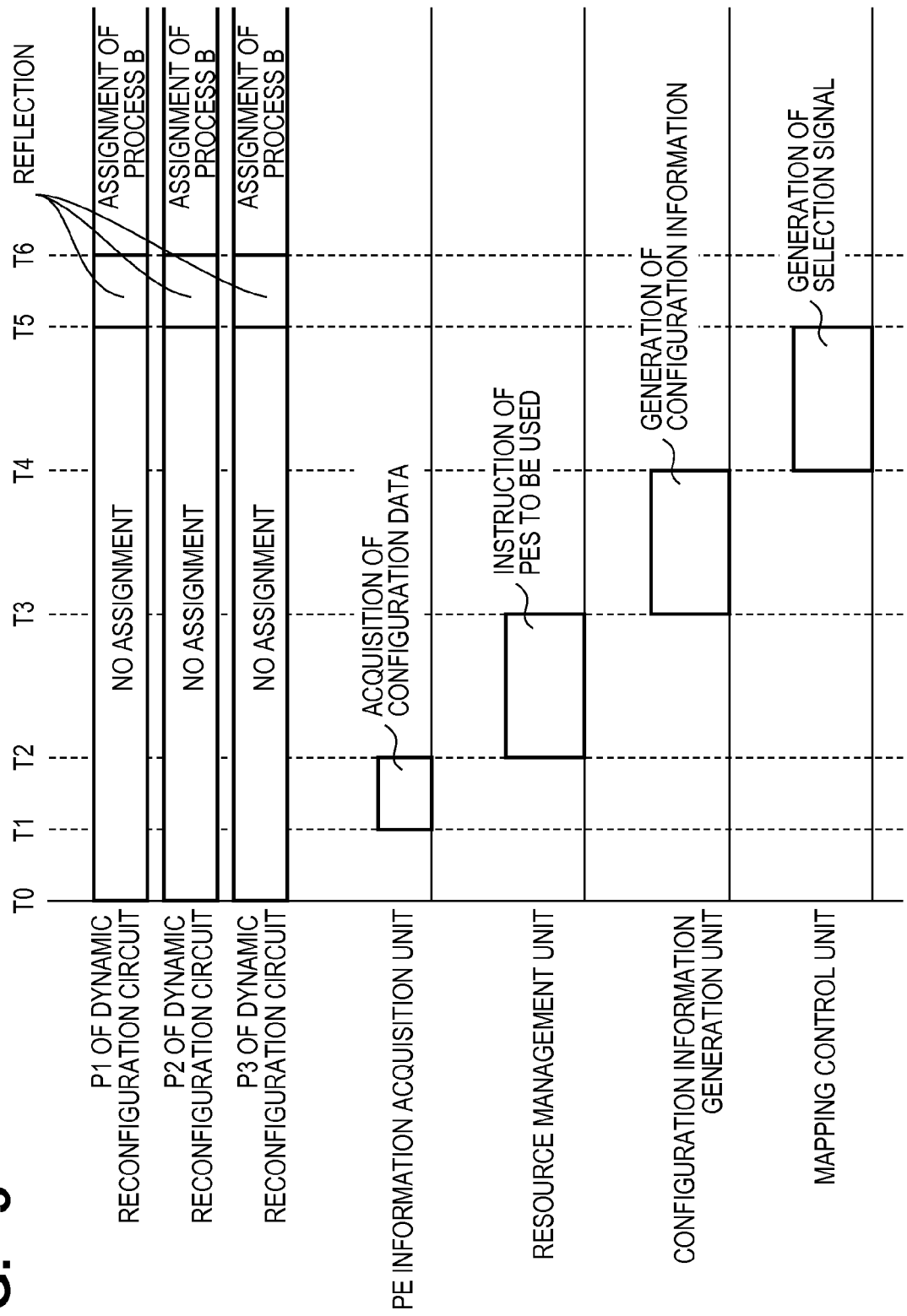

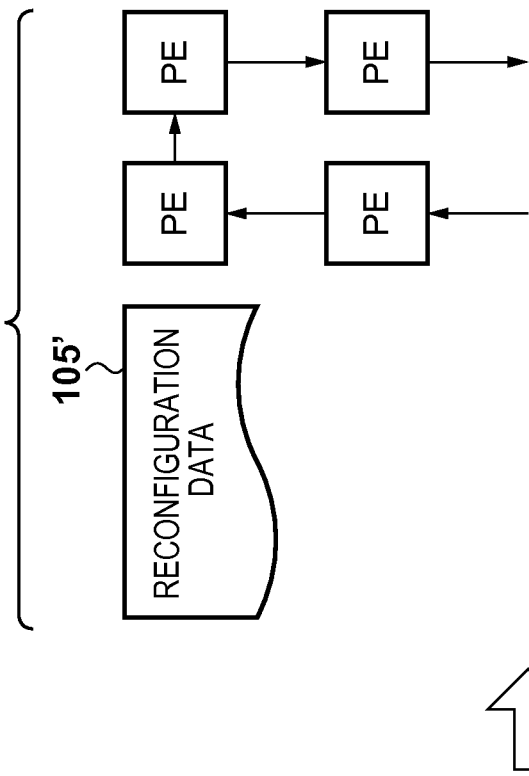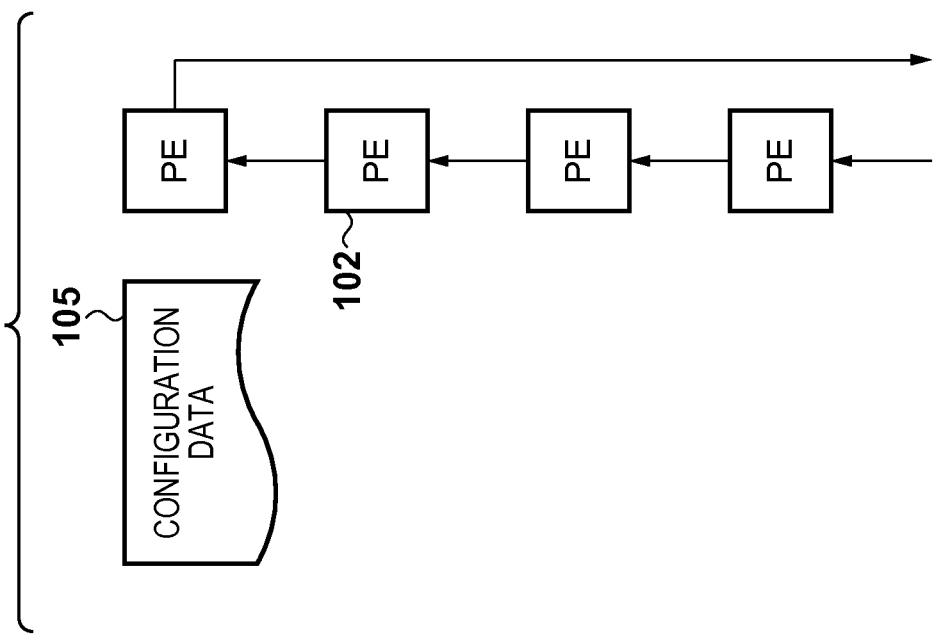

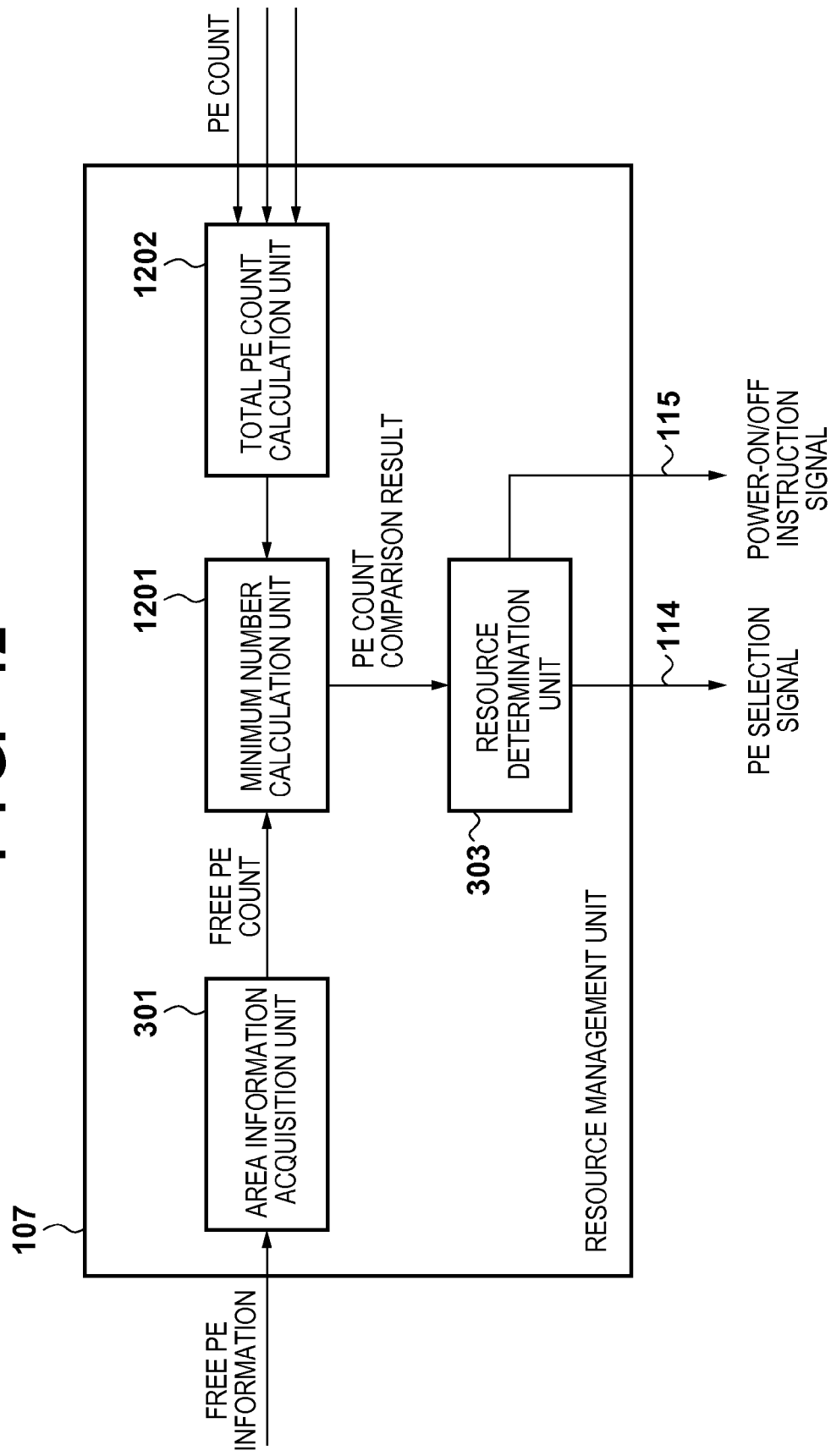

F I G. 17

| TYPE NUMBER | PE TYPE |
|---|---|
| 01 | GENERAL-PURPOSE PE |
| 02 | ASPEa |
| 03 | ASPEb |

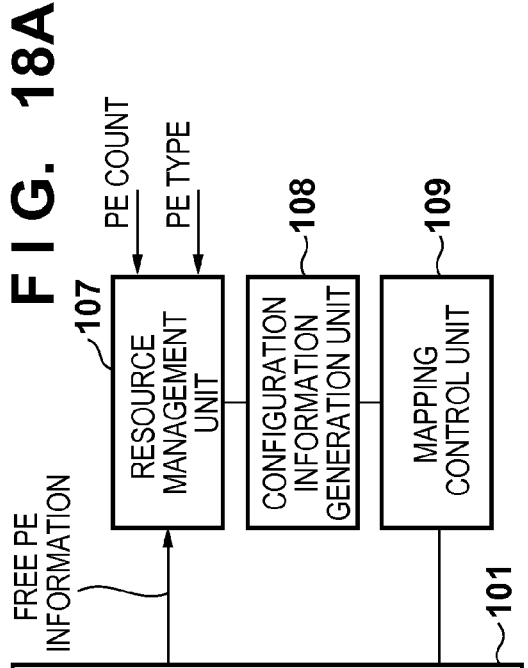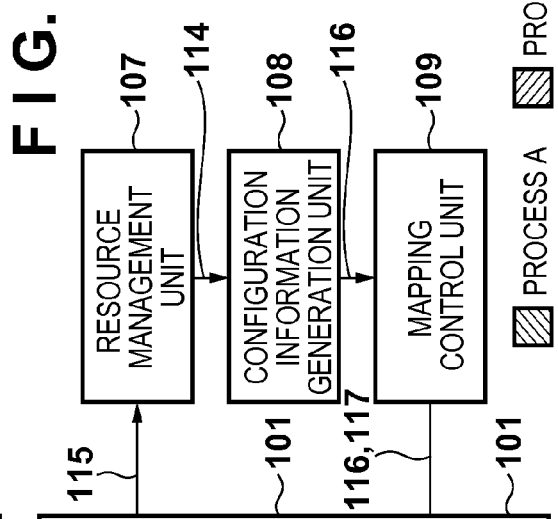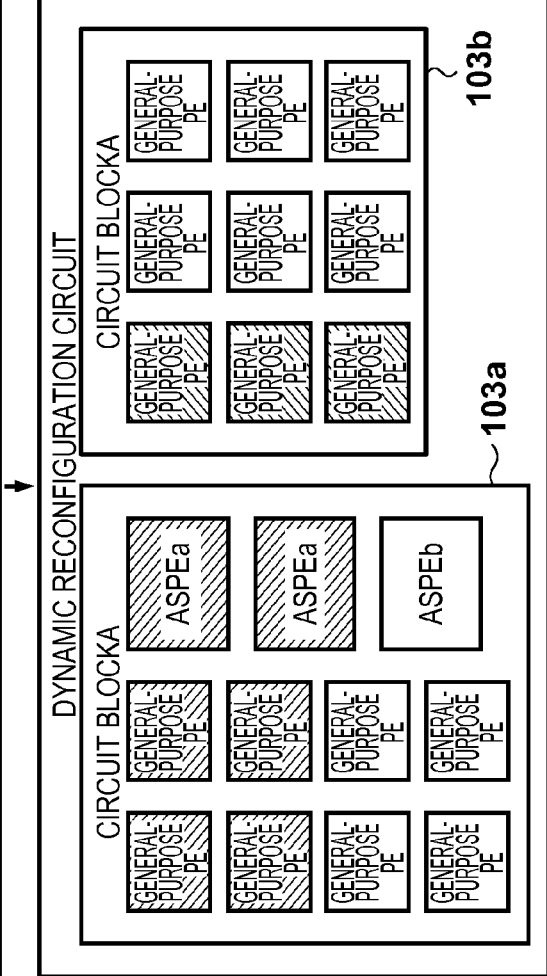

INFORMATION PROCESSING APPARATUS AND CONTROL METHOD THEREOF

BACKGROUND OF THE INVENTION

1. Field of the Invention

The present invention relates to an information processing apparatus which includes a plurality of arithmetic elements and is capable of dynamic reconfiguration.

2. Description of the Related Art

Miniaturization of elements thanks to the progress of semiconductor manufacturing techniques has made it possible to integrate an enormous number of transistors on a large scale integration (LSI). However, the miniaturization and an increase in the number of transistors increase static power (explained below). Further, power in operation increases as the processor frequency increases. As a result, performance and reduction of power consumption have a tradeoff relationship, and improvement of performance is approaching its limit.

As a means for further improving performance, an array arithmetic apparatus is receiving attention, in which a plurality of processor elements (PEs) such as a central processing unit (CPU), digital signal processor (DSP), single arithmetic device, and arithmetic unit are mounted on an LSI. The array arithmetic apparatus performs parallel processes by using a plurality of PEs, and can obtain high arithmetic performance even in a situation in which an increase in operating frequency by miniaturization in a process cannot be expected, compared to before.

In the future, logic performance can be improved by increasing the number of PEs to be mounted by the advance of large-scale techniques and integration techniques. However, performance improvement and power reduction cannot both be achieved unless a means or measure is taken to suppress power consumption which increases at the same time.

A measure to reduce dynamic power consumed by functional operation and static power generated just by supplying power to a transistor will be explained.

Dynamic power is power consumed by a current flowing to charge/discharge a parasitic capacitance upon a signal change, and a current flowing in transistor switching, such as a flow-through current. Hence, the dynamic power drawn can be reduced by suppressing signal changes as long as the functional operation is not hindered. A typical power saving method based on this principle is clock gating, which is widely used in general.

To the contrary, static power is power which is consumed for charges to be supplied to the parasitic capacitance of a transistor, and leakage current. Along with miniaturization in a process, the parasitic capacitance tends to decrease, and the leakage current tends to increase. In particular, as a polysilicon gate oxide film became thinner, the leakage current once exhibited an exponential increase. To reduce the leakage current, it is effective to restrict the voltage supplied to a transistor to be low, or shut down the transistor. Therefore, as a technique for reducing leakage power, power shutdown of blocks driven by the same power supply has been adopted popularly.

Power shutdown in a semiconductor integrated circuit is a technique of connecting a power supply path extending to a power shutdown target portion, with a power supply, by using a power supply switch formed from a transistor, and if necessary, switching the power supply switch between conduction and shutdown in the semiconductor integrated circuit. At present, the leakage current does not exhibit the conventional exponential increase thanks to improvements in materials and manufacturing methods, but still does increase linearly. Power shutdown will be important as a power reduction method. In the following description, a portion on an integrated circuit where supply and shutdown of power to an element arranged in a desired area can be controlled will be defined as a "power-supply controlled area".

Even a large-scale array arithmetic apparatus uses the power shutdown technique to effectively reduce the leakage current. Power consumption can be suppressed by configuring a plurality of power-supply controlled areas and performing fine power management to partially shut down power to inactive PEs.

Under these circumstances, a method of reducing power consumption in an array arithmetic apparatus capable of dynamic reconfiguration has been examined. For example, there is proposed a method of changing switching of power-on/off and the wiring state between logical blocks based on preset power saving operation data. The power saving operation data is generated based on information about a power consumption profile, the transition time from the power saving state to the normal operation state, and the analysis result of a transition factor.

When processes are sequentially executed by a configuration using a processor capable of dynamic reconfiguration, mapping of circuit configuration information needs to be switched before executing the next process. There has been proposed a method of acquiring a free resource of an arithmetic device array or processor array mounted on a dynamic reconfiguration circuit, and mapping a process to the free resource.

However, since more advanced functions and higher performance will be required, it is predicted that integration using a leading-edge manufacturing process will be advanced to mount a large number of PEs. To reduce the leakage current effectively, it is necessary to configure a plurality of power-supply controlled areas and perform fine power management to partially shut down power to inactive PEs. However, as a larger number of power-supply controlled areas are arranged, the area of the power supply switch increases, and control of power shutdown and return becomes complicated.

When many PEs are mounted on a chip in the future, the area overhead of the power supply switch will cause a serious problem. Thus, one power-supply controlled area will be arranged for a plurality of PEs to configure power-supply controlled areas in various division forms.

If the number of power-supply controlled areas increases by N, there are $2^N$ combinations of power shutdown and return. It is therefore difficult to grasp each arithmetic process state and circuit configuration state, and optimize power supply so that power is supplied only to the minimum set of PEs that need to be used.

When many PEs are mounted and power-supply controlled areas are configured in various division forms, it becomes more complex to, for example, control the power supply and circuit configuration in consideration of the configuration and physical arrangement of the power-supply controlled areas. Hence, it is necessary to search for an optimal configuration and perform control complying with the configuration.

To implement an advanced-function, high-performance array arithmetic apparatus, various complicated arithmetic processes need to be assigned to PEs more flexibly to improve the execution performance. It is predicted that there will be widely applied in the future a circuit capable of dynamic reconfiguration in which the circuit configuration is appropriately switched dynamically in accordance with a process to be executed, and a plurality of processes can be executed.

However, the conventional dynamic reconfiguration circuit does not perform mapping control of a process in consideration of power-supply controlled areas implemented in various division forms. The conventional method may disperse, to a plurality of power-supply controlled areas during the system operation, processes to be mapped to a processor array. For example, when a process is newly mapped to the processor array, it may be mapped to PEs that are currently in the power-off state even though it could be mapped to PEs already in the power-on state. In this case, a power-supply controlled area to which the process-mapped PE belongs needs to be changed to the power-on state, increasing the number of areas in the power-on state. As a result, static power is consumed by unwanted and unnecessary leakage current in the processor array.

Further, when a power-supply controlled area is changed to the power-on state, the parasitic capacitance in the power-supply controlled area needs to be charged, additionally consuming power by charging (to be referred to below as "charge power"). If such power-on/off switching of a power-supply controlled area occurs frequently, the charge power increases correspondingly, since the charge power that is drawn is in proportion to the switching count.

In this manner, in the conventional dynamic reconfiguration circuit, process mapping to the processor array does not consider the power-supply controlled area(s), so process mapping to reduce power consumption cannot be performed.

SUMMARY OF THE INVENTION

In one aspect, an information processing apparatus comprising: a plurality of circuit blocks, each of which comprises a plurality of arithmetic elements; a power supply controller configured to individually control power supply to the plurality of circuit blocks; an acquisition unit configured to acquire first information regarding an arithmetic element necessary for an arithmetic process, and second information regarding an arithmetic element included in a circuit block which is supplied power; and a management unit configured to preferentially assign, based on the first information and the second information, a process for implementing the arithmetic process, to the arithmetic element included in the circuit block which is supplied power.

According to the aspect, power saving in an information processing apparatus which includes a plurality of arithmetic elements and is capable of dynamic reconfiguration is implemented.

Further features of the present invention will become apparent from the following description of exemplary embodiments with reference to the attached drawings.

BRIEF DESCRIPTION OF THE DRAWINGS

FIG. 4 is a view for explaining a register which is arranged in an area information acquisition unit and holds power-supply controlled area information, power-on/off information, and free PE information.

FIG. 5 is a timing chart showing configuration operation example 1.

FIGS. 11A and 11B are views for explaining an example in which a configuration information generation unit reconfigures configuration data.

FIG. 12 is a block diagram showing the configuration of a resource management unit according to the third embodiment.

FIG. 17 is a table exemplifying the relationship between the PE type and the type number.

FIGS. 18A and 18B are views exemplifying process assignment states.

DESCRIPTION OF THE EMBODIMENTS

An information processing apparatus according to embodiments of the present invention will now be described in detail with reference to the accompanying drawings. An example of applying the present invention to an array arithmetic apparatus serving as a kind of information processing apparatus will be explained.

A case in which an arithmetic element is a processor element (PE) will be exemplified. The PE is an arithmetic element which sequentially reads out either instruction codes or process data or both from a memory (not shown) such as a random access memory (RAM) or read only memory (ROM), and sequentially executes a plurality of arithmetic processes.

An array arithmetic apparatus (information processing apparatus) including a plurality of PEs acquires first information, about the number and type of PEs necessary for an arithmetic process, and second information, about the execution state of a process by the PEs of a circuit block which is supplied with power. Based on the first information and second information, the array arithmetic apparatus preferentially assigns (maps), to the PEs of a circuit block which is currently supplied with power, a process for implementing an arithmetic process.

First Embodiment

Apparatus Configuration

Figure 1:
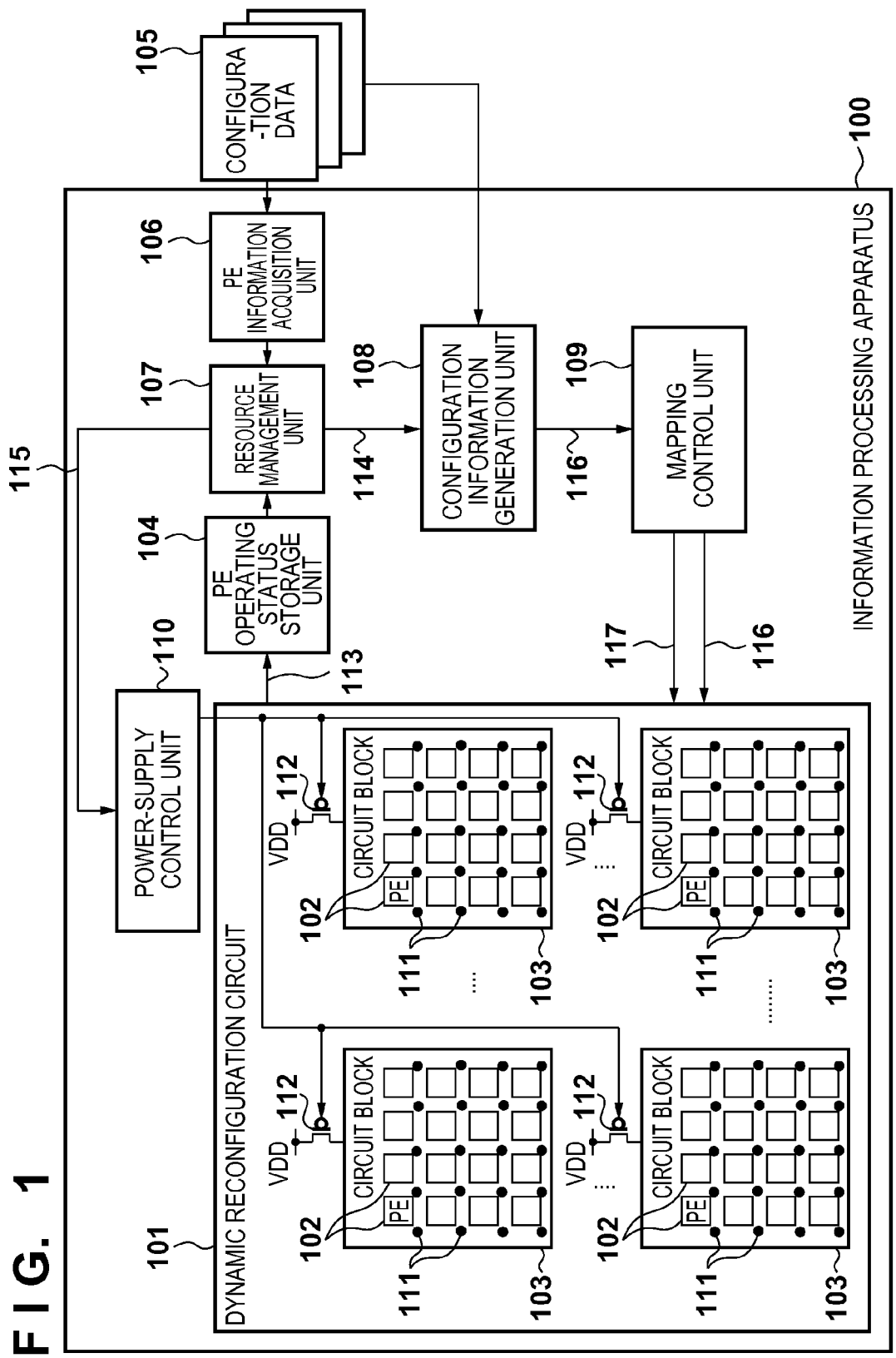
FIG. 1 is a block diagram showing the configuration of an information processing apparatus according to an embodiment.

The configuration of an information processing apparatus 100 according to the embodiment will be described with reference to the block diagram of FIG. 1.

A dynamic reconfiguration circuit 101 includes a plurality of circuit blocks 103. Each circuit block 103 includes PEs 102 which are arrayed, and routers 111 which connect the PEs. The circuit block 103 is connected to a corresponding power supply switch 112 for switching between power shutdown and power supply. That is, each circuit block 103 receives a power supply voltage VDD from a power supply circuit block (not shown) via the power supply switch 112. The respective circuit blocks 103 are set as power-supply controlled areas, and can switch between power shutdown and power supply.

The information processing apparatus 100 receives configuration data 105 for setting the configuration. The configuration data 105 is data including the internal configuration setting and input/output setting of the PEs 102, the setting of the routers 111, and information about the PE count and PE type. The configuration data is created by an application running on a computer device such as a personal computer, and is stored in, for example, a nonvolatile memory of the device.

A PE information acquisition unit 106 receives the configuration data 105 from the computer device, and outputs a PE count to a resource management unit 107. A PE operating status storage unit 104 receives a process start completion signal 113 from the PE 102, as needed, and outputs free PE information to the resource management unit 107.

The resource management unit 107 receives the PE count from the PE information acquisition unit 106, and receives the free PE information from the PE operating status storage unit 104. The resource management unit 107 outputs, to a configuration information generation unit 108, an instruction (PE selection signal) 114 for PEs to be used. The resource management unit 107 also outputs a power-on/off instruction signal 115 to a power-supply control unit 110.

The configuration information generation unit 108 receives the configuration data 105, receives the PE selection signal 114 from the resource management unit 107, and outputs new configuration information 116 to a mapping control unit 109. The mapping control unit 109 receives the configuration information 116 from the configuration information generation unit 108, and outputs a PE/router selection signal 117 and the configuration information 116 to the dynamic reconfiguration circuit 101.

The power-supply control unit 110 receives the power-on/off instruction signal 115 from the resource management unit 107, switches the ON/OFF state of each power supply switch 112, and individually controls supply of power to the circuit block 103.

Circuit Block

Figure 2:
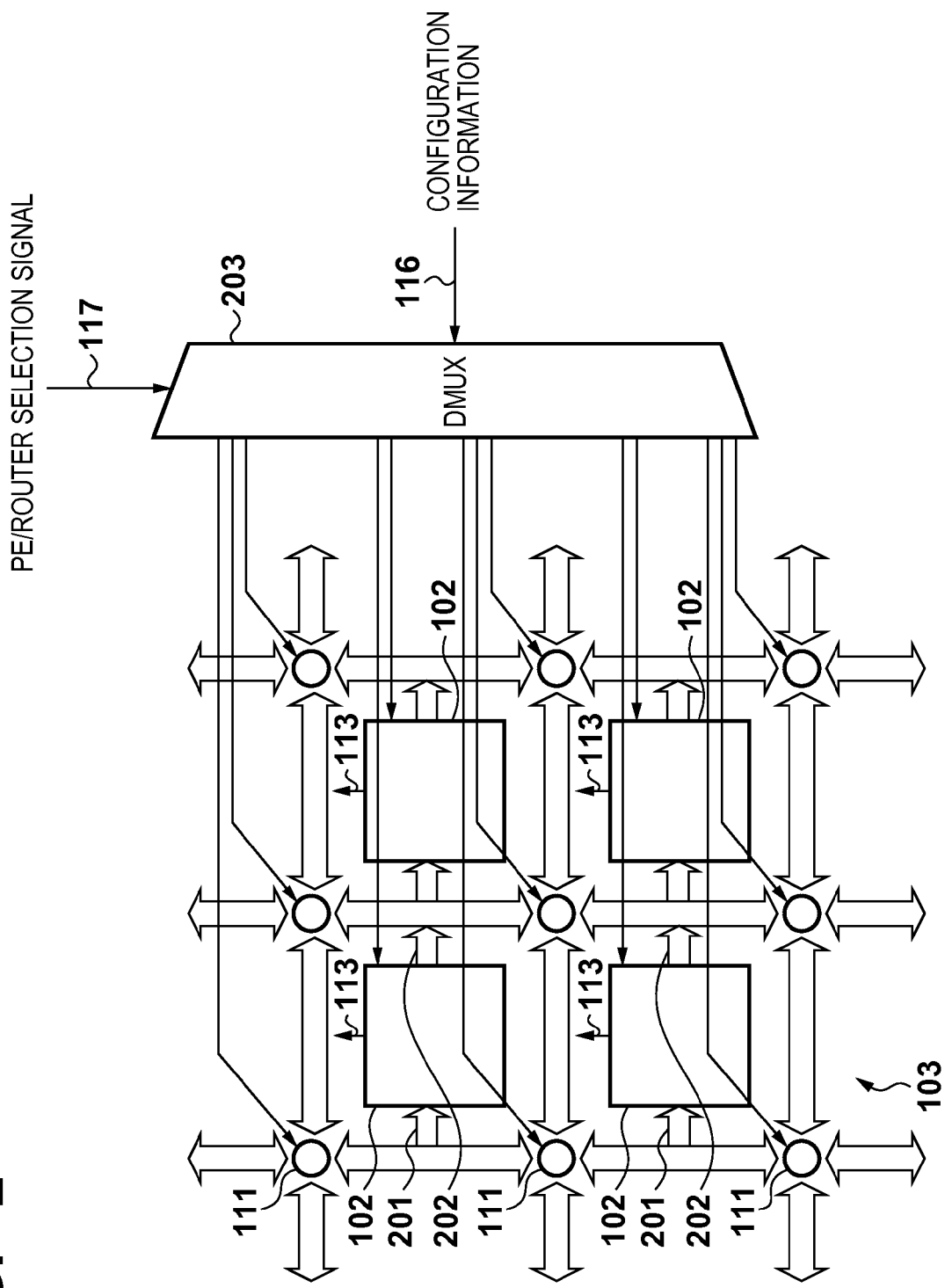
FIG. 2 is a block diagram for explaining the internal configuration of a circuit block.

The internal configuration of the circuit block 103 will be explained with reference to the block diagram of FIG. 2.

A demultiplexer (DMUX) 203 receives the PE/router selection signal 117 and configuration information 116 from the mapping control unit 109, and transmits the configuration information 116 to a PE and router designated by the PE/router selection signal 117.

The PE 102 includes building components such as a logical arithmetic unit and storage unit (none are shown). The PE 102 processes data supplied from a data input unit 201, and outputs the processed data from a data output unit 202. The PE 102 outputs the process start completion signal 113 to the PE operating status storage unit 104 at the start and completion of execution of an arithmetic process.

The router 111 receives the configuration information 116 from the mapping control unit 109, and determines a data transfer path between PEs. The router 111 includes, for example, a setting holding unit (register) and path switching unit (crossbar) (neither is shown) as building components.

Resource Management Unit

The internal configuration of the resource management unit 107 will be explained with reference to the block diagram of FIG. 3.

An area information acquisition unit 301 receives free PE information from the PE operating status storage unit 104, and outputs a free PE count in each power-supply controlled area to a PE count comparison unit 302.

A register 401 which is arranged in the area information acquisition unit 301 and holds power-supply controlled area information, power-on/off information, and free PE information will be described with reference to FIG. 4.

In the register 401, the power-supply controlled area information represents a power-supply controlled area to which each PE belongs. The power-on/off information represents the power-on/off state of each PE. The register 401 holds "1" for the power-on state and "0" for the power-off state. The free PE information represents whether each PE is free. The register 401 holds "0" when each PE is free, and "1" when it is not free.

Figure 3:
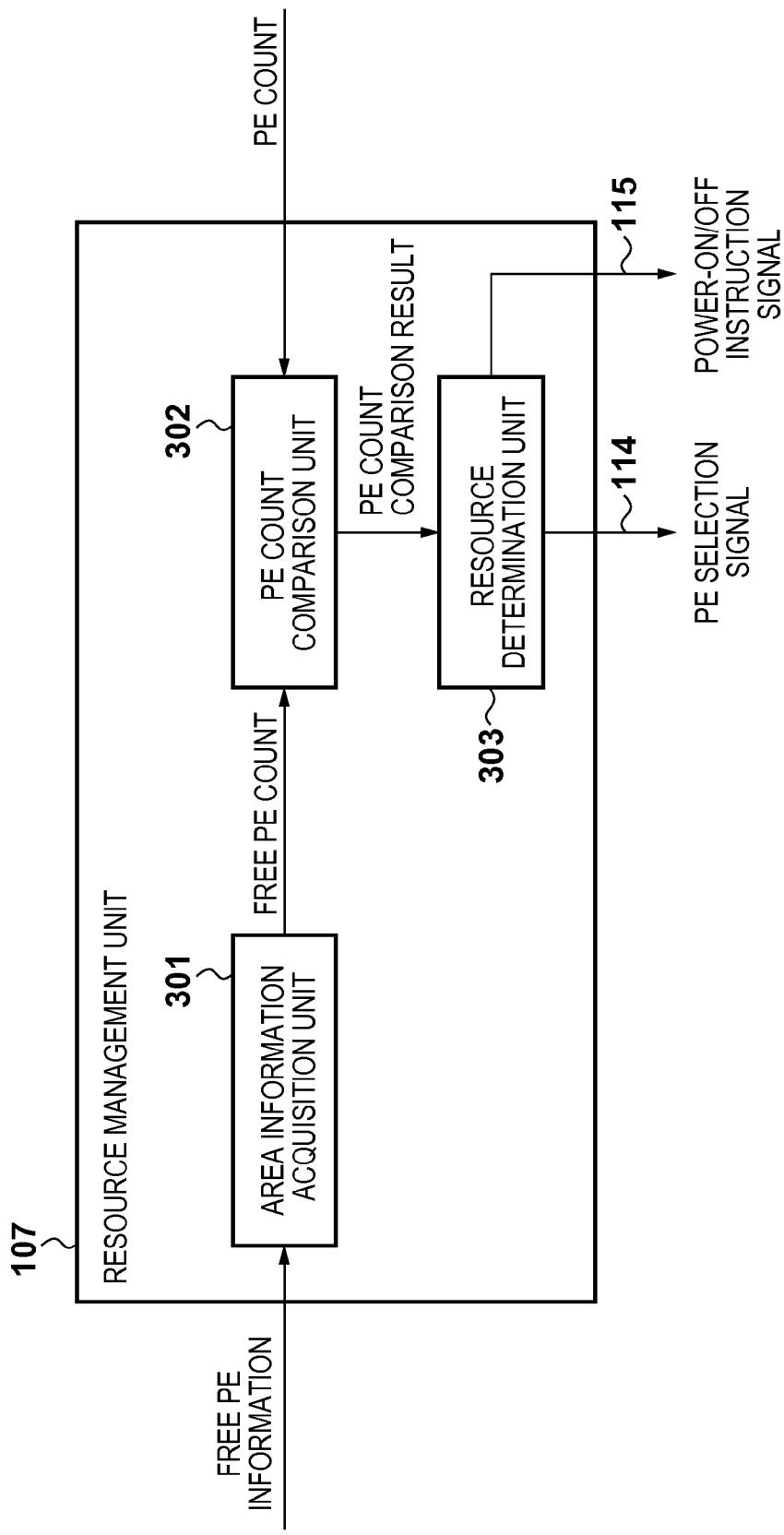
FIG. 3 is a block diagram for explaining the internal configuration of a resource management unit.

The PE count comparison unit 302 shown in FIG. 3 receives the free PE count of a power-supply controlled area from the area information acquisition unit 301, receives a PE count from the PE information acquisition unit 106, and outputs the PE count comparison result to a resource determination unit 303.

The resource determination unit 303 receives the comparison result from the PE count comparison unit 302, outputs the PE selection signal 114 to the configuration information generation unit 108, and outputs the power-on/off instruction signal 115 to the power-supply control unit 110.

[Configuration Operation]

A series of operations until the information processing apparatus 100 acquires in advance the PE count of the configuration data 105, acquires a free PE count in the power-on state, and executes configuration will be explained. In the operations to be described below, when a process is being executed, configuration to be executed next is performed in advance.

The PE information acquisition unit 106 acquires a PE count included in the configuration data 105 prior to acquisition of the configuration data 105 by the configuration information generation unit 108, and outputs the acquired PE count to the resource management unit 107.

The PE operating status storage unit 104 outputs a logical value "1" to the resource management unit 107 when notified of the start of a process from each PE, and a logical value "0" to the resource management unit 107 when notified of the end of a process from each PE.

Upon receiving free PE information from the PE operating status storage unit 104, the area information acquisition unit 301 of the resource management unit 107 holds the information in the register 401. The resource management unit 107 counts the number of pieces of free PE information having the logical value "0" in a power-supply controlled area for which power-on/off information in the register 401 is the logical value "1", thereby acquiring the free PE count of each power-supply controlled area.

The PE count comparison unit 302 compares the free PE count received from the area information acquisition unit 301 with the PE count received from the PE information acquisition unit 106. As the PE count comparison result, the PE count comparison unit 302 outputs the logical value "1" to the resource determination unit 303 when the free PE count≥the PE count, and the logical value "0" when the free PE count<the PE count.

If the received PE count comparison result is the logical value "1", the resource determination unit 303 determines that a process can be assigned to PEs in the power-on state, and outputs the PE selection signal 114 to the configuration information generation unit 108. If the received PE count comparison result is the logical value "0", the resource determination unit 303 determines that no process can be assigned to PEs in the power-on state. An operation when it is determined that no process can be assigned to PEs in the power-on state will be described later.

The configuration information generation unit 108 generates new configuration information 116 based on the configuration data 105, and the PE selection signal 114 received from the resource management unit 107, and outputs the generated configuration information 116 to the mapping control unit 109. The configuration information 116 includes selection information of a PE, configuration information of the internal circuit of a PE, input/output configuration information of a PE, and router setting information (connection information between arithmetic elements).

Upon receiving the configuration information 116, the mapping control unit 109 selects a PE and router in which the configuration information 116 is reflected, generates the PE/router selection signal 117, and outputs the generated PE/router selection signal 117 to the DMUX 203 together with the configuration information 116.

Upon receiving the PE/router selection signal 117 from the mapping control unit 109, the DMUX 203 switches the output destination of the configuration information 116 in accordance with the PE/router selection signal 117.

The configuration information 116 is provided from the DMUX 203 to the PE 102 and router 111 complying with the PE/router selection signal 117. Accordingly, the circuit configuration and input/output in the PE 102, and the path of the router 111 are configured. Upon completion of setting the PE 102 and router 111, the circuit block 103 executes a process (arithmetic or image process) based on the configuration information 116.

If there is a process to be executed next after the end of the configuration operation, the above-described configuration operation is repetitively executed. If there is no process to be executed next, the configuration operation ends.

Configuration Operation Example 1

When there are the PEs 102 in the power-on state and the PEs 102 in the power-off state, the information processing apparatus 100 preferentially assigns a process to be newly executed to the PEs 102 in the power-on state. An operation when a process can be assigned to the free PEs 102 in the power-on state will be explained.

A case in which the number of circuit blocks 103 in the dynamic reconfiguration circuit 101 is two, and a PE count set in the configuration data 105 is three will be explained. The configuration data 105 which designates a process to be newly executed designates the use of three PEs 102 in the dynamic reconfiguration circuit 101. Assume that one circuit block 103 is in the power-on state, the other circuit block 103 is in the power-off state, and each circuit block has free PEs enough to assign a process. The operation of the information processing apparatus 100 in this state will be explained.

Figure 6A:
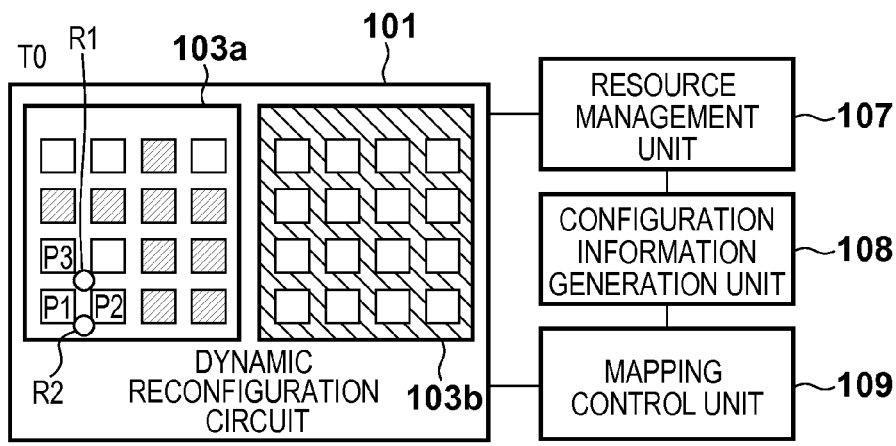
FIGS. 6A to 6C are views showing process assignment states at respective times.
Figure 6B:
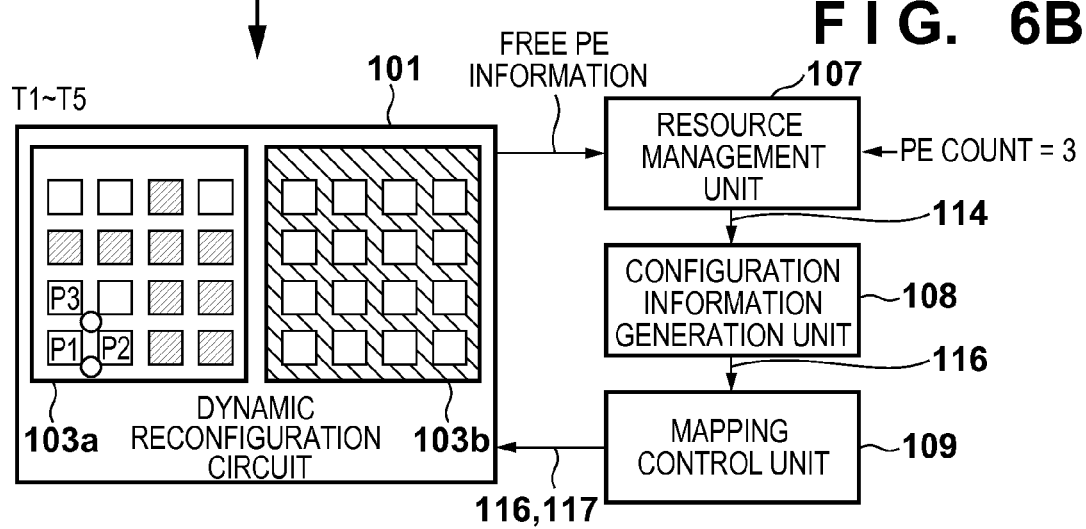
Figure 6C:
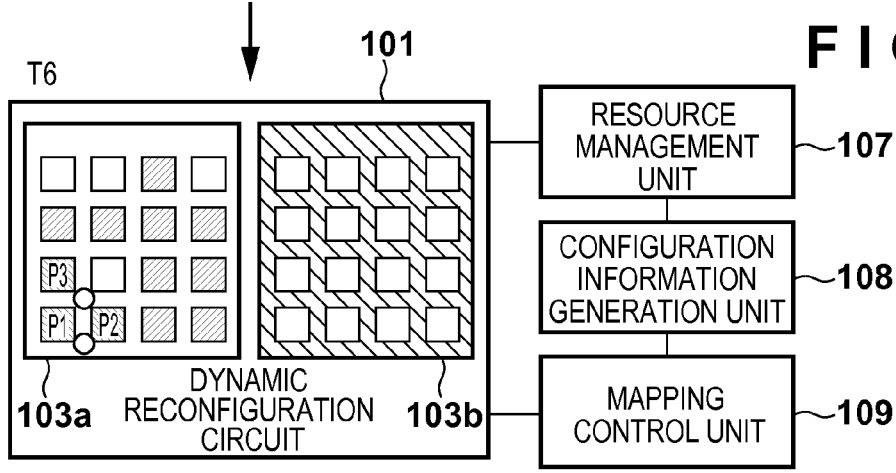

FIG. 5 is a timing chart showing configuration operation example 1. FIGS. 6A to 6C show process assignment states at respective times. In FIGS. 6A to 6C, process A and process B are arbitrary arithmetic processes to be executed by the PEs 102. P1 to P3 correspond to the PEs 102, and R1 and R2 correspond to the routers 111.

At time T0, a circuit block 103a in the dynamic reconfiguration circuit 101 is executing process A in a process assignment state shown in FIG. 6A, and a circuit block 103b is in the power-off state. No process is assigned to P1 to P3 in the circuit block 103a.

In an interval between time T1 and time T2, the PE information acquisition unit 106 receives the configuration data 105 corresponding to process B, and acquires a PE count designated by the configuration data 105. The received configuration data 105 designates execution of process B using three PEs 102.

In an interval between time T2 and time T3, the resource management unit 107 receives the PE count (=3) from the PE information acquisition unit 106. At this time, the circuit blocks 103a and 103b include free PEs enough to assign process B. The resource management unit 107 determines to preferentially use free PEs in the circuit block 103a in the power-on state, and outputs, to the configuration information generation unit 108, the PE selection signal 114 representing the use of P1 to P3.

In an interval between time T3 and time T4, the configuration information generation unit 108 generates, in accordance with the PE selection signal 114 received from the resource management unit 107, the configuration information 116 for using P1 to P3 in the circuit block 103a. The configuration information generation unit 108 outputs the generated configuration information 116 to the mapping control unit 109. In an interval between time T4 and time T5, the mapping control unit 109 generates the PE/router selection signal 117 for selecting P1 to P3, R1, and R2, and outputs the generated PE/router selection signal 117 and configuration information 116 to the DMUX 203.

In an interval between time T5 and time T6, the circuit configuration and input/output of P1 to P3, and the paths of R1 and R2 are set. At time T6, execution of process B starts. At time T6, the process assignment state of the circuit block 103a in the dynamic reconfiguration circuit 101 changes to one shown in FIG. 6C.

Configuration Operation Example 2

Configuration operation example 1 has explained an operation when the resource determination unit 303 determines that a process can be assigned to free PEs in the power-on state. However, the free PE count may be insufficient, and no process may be able to be assigned to free PEs in the power-on state. In this case, the information processing apparatus 100 selects free PEs in the power-off state, changes them to the power-on state, and executes configuration.

If a comparison result received from the PE count comparison unit 302 is the logical value "0", the resource determination unit 303 determines that no process can be assigned to the PEs 102 in the power-on state. In this case, the resource management unit 107 causes the area information acquisition unit 301 and PE count comparison unit 302 to determine whether the PEs 102 in the circuit block 103b satisfy a sufficient PE count when the circuit block 103b is turned on.

If the PEs 102 in the circuit block 103b satisfy a sufficient PE count, the resource management unit 107 causes the resource determination unit 303 to output, to the power-supply control unit 110, the power-on/off instruction signal 115 for changing the circuit block 103b to the power-on state. Further, the resource management unit 107 causes the resource determination unit 303 to output, to the configuration information generation unit 108, the PE selection signal 114 representing the use of the PEs 102 in the circuit block 103b.

In accordance with the power-on/off instruction signal 115 received from the resource determination unit 303, the power-supply control unit 110 controls the power supply switch 112 to change the circuit block 103 in the power-off state to the power-on state. By the same operation as configuration operation example 1, configuration of the circuit block 103 which has changed to the power-on state is executed.

Configuration Operation Example 3

A case in which the number of circuit blocks 103 in the dynamic reconfiguration circuit 101 is two, and the number of PEs set in the configuration data 105 is four will be explained. The configuration data 105 which designates a process to be newly executed designates the use of four PEs 102 in the dynamic reconfiguration circuit 101. Assume that one circuit block 103 is in the power-on state, the other circuit block 103 is in the power-off state, and the circuit block 103 in the power-on state does not have free PEs necessary to assign the process. The operation of the information processing apparatus 100 in this state will be explained.

Figure 7:
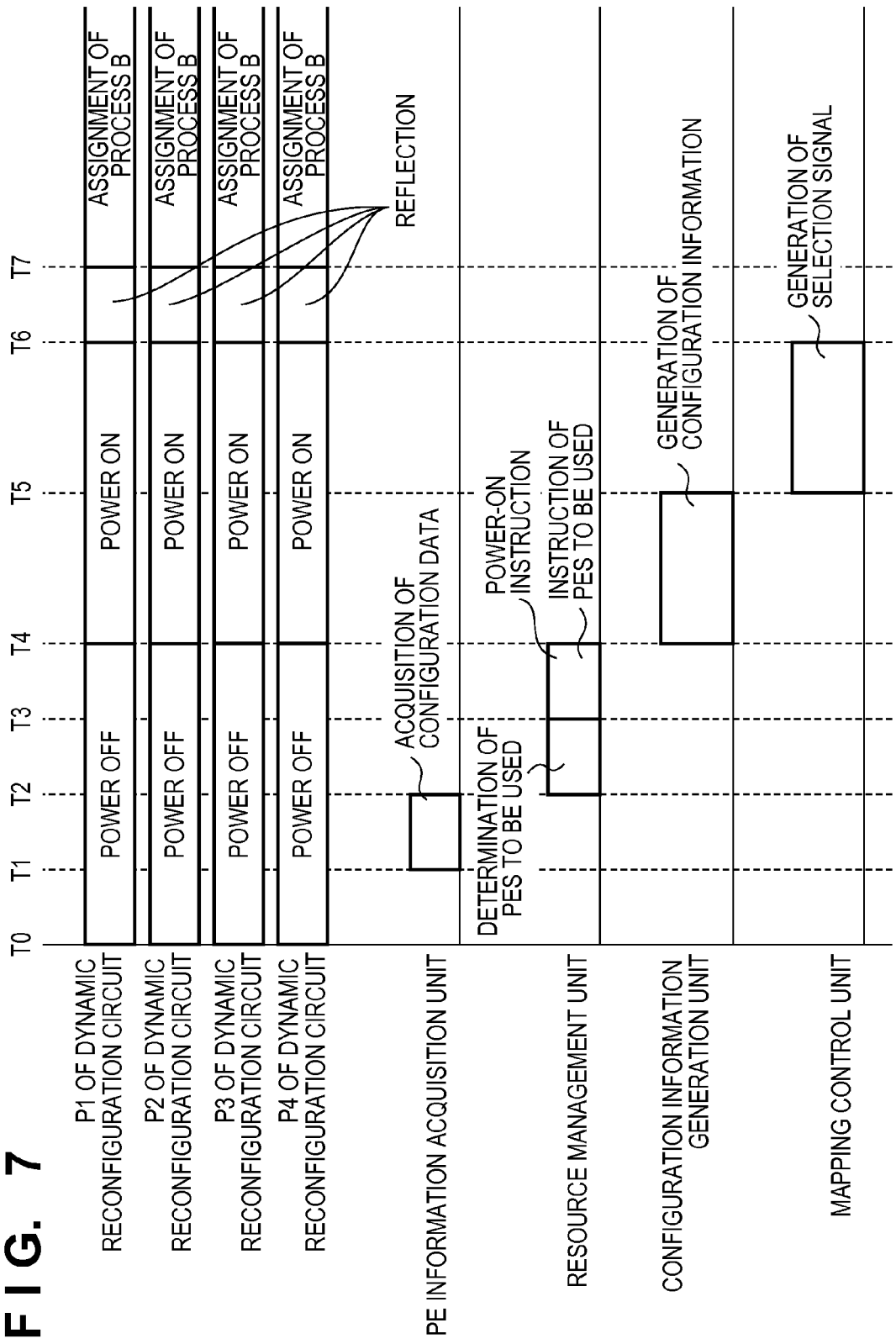
FIG. 7 is a timing chart showing configuration operation example 3.
Figure 8A:
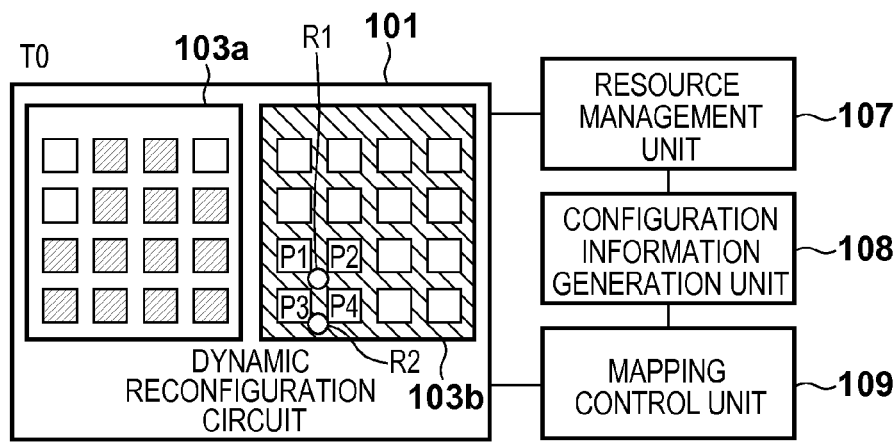
FIGS. 8A to 8C are views showing process assignment states at respective times.
Figure 8B:
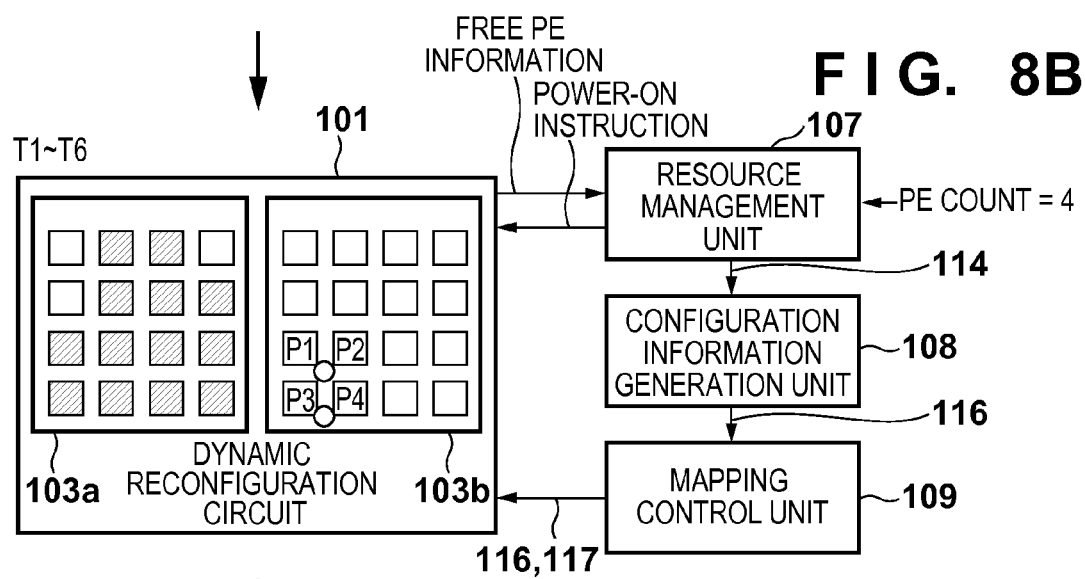
Figure 8C:
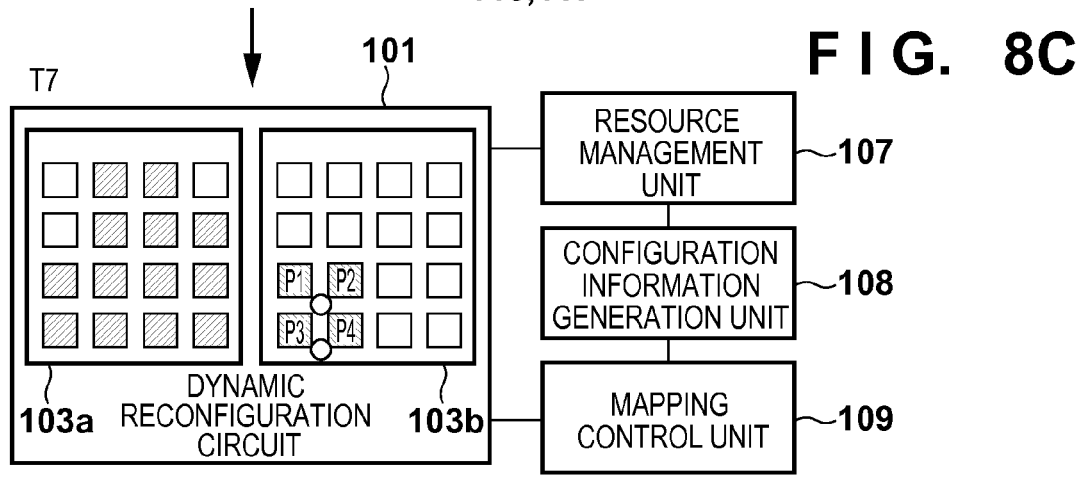

FIG. 7 is a timing chart showing configuration operation example 3. FIGS. 8A to 8C show process assignment states at respective times. In FIGS. 8A to 8C, process A and process B are arbitrary arithmetic processes to be executed by the PEs 102. P1 to P4 correspond to the PEs 102, and R1 and R2 correspond to the routers 111.

At time T0, the circuit block 103a in the dynamic reconfiguration circuit 101 is executing process A in a process assignment state shown in FIG. 8A, and the circuit block 103b is in the power-off state. The circuit block 103a include three PEs 102 to which no process is assigned.

In an interval between time T1 and time T2, the PE information acquisition unit 106 receives the configuration data 105 corresponding to process B, and acquires a PE count designated by the configuration data 105. The received configuration data 105 designates execution of process B using four PEs 102.

In an interval between time T2 and time T3, the resource management unit 107 receives the PE count (=4) from the PE information acquisition unit 106. At this time, the circuit block 103a does not have free PEs enough to assign process B, but the circuit block 103b have free PEs enough to assign process B. Thus, the resource management unit 107 determines that the circuit block 103a in the power-on state does not have a necessary number of free PEs, and determines that the resource of the circuit block 103b is necessary.

In an interval between time T3 and time T4, the resource management unit 107 outputs, to the power-supply control unit 110, the power-on/off instruction signal 115 for changing the circuit block 103b in the power-off state to the power-on state. Further, the resource management unit 107 outputs, to the configuration information generation unit 108, the PE selection signal 114 representing the use of P1 to P4 in the circuit block 103b.

In an interval between time T4 and time T5, the configuration information generation unit 108 generates the configuration information 116 for using P1 to P4 in the circuit block 103b, and outputs the generated configuration information 116 to the mapping control unit 109. In an interval between time T5 and time T6, the mapping control unit 109 generates the PE/router selection signal 117 for selecting P1 to P4, R1, and R2, and outputs the generated PE/router selection signal 117 and configuration information 116 to the DMUX 203.

During an interval between T4 to T6, the circuit block 103b changes from the power-off state to the power-on state (FIG. 8B).

In an interval between time T6 and time T7, the circuit configuration and input/output of P1 to P4, and the paths of R1 and R2 are set. At time T7, execution of process B starts. At time T7, the process assignment state of the circuit block 103b in the dynamic reconfiguration circuit 101 changes to one as shown in FIG. 8C.

In this way, the resource of each power-supply controlled area is managed, and a process to be newly assigned to PEs performs configuration to preferentially assign, to a free resource in the power-on state. When a free resource in the power-on state is insufficient, a free resource in the power-off state is changed to the power-on state, and configuration is performed to assign the process to this resource.

Hence, the dynamic reconfiguration circuit can suppress the static power by preventing unwanted transition of a circuit block (processor array) from the power-off state to the power-on state. By preferentially using the resource of a power-supply controlled area (circuit block) in the power-on state, the power-on/off switching count of the power-supply controlled area can be decreased, reducing the charge power.

Description of Configuration of Configuration Data Generation Apparatus

The configuration of an apparatus which generates the configuration data 105 for switching a process from a data flow to another one will be described with reference to the block diagram of FIG. 19.

Figure 19:
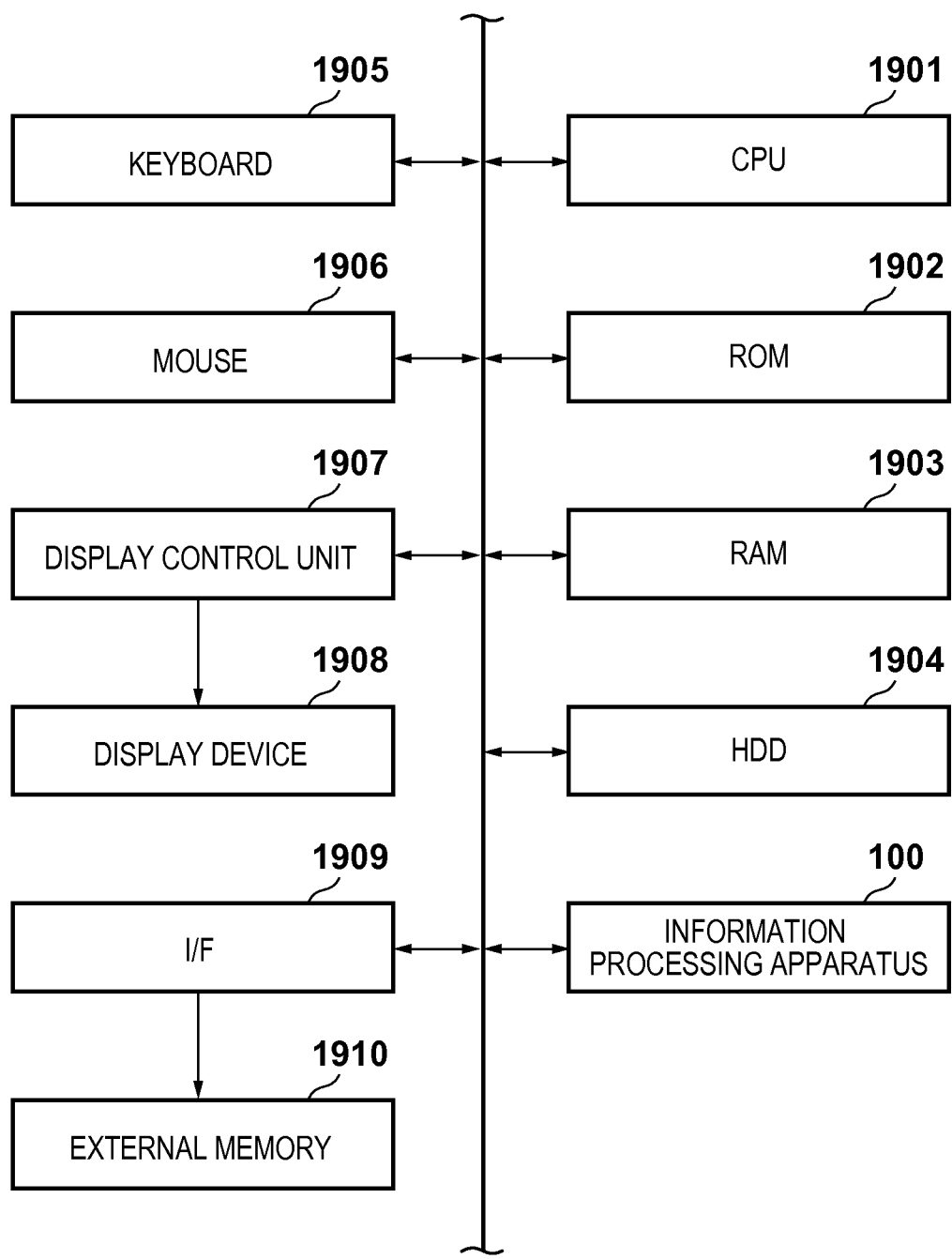
FIG. 19 is a block diagram showing the configuration of an apparatus which generates configuration data for switching a process from a data flow to another one.

In FIG. 19, a microprocessor (CPU) 1901 controls the overall apparatus. A read only memory (ROM) 1902 stores a boot program and the like. A random access memory (RAM) 1903 is used as a work area for the CPU 1901, and stores an operating system (OS) and applications.

A hard disk drive (HDD) 1904 stores an OS, an application for creating the configuration data 105, and various data. A keyboard 1905 and mouse 1906 function as user interfaces.

A display control unit 1907 incorporates a video memory and display controller. A display device 1908 receives a video signal from the display control unit 1907, and displays an image represented by the video signal.

An interface (I/F) 1909 is an interface for communicating with various external devices. For example, when an external memory 1910 shown in FIG. 19 is connected, the configuration data 105 created by the configuration data generation apparatus is written in the external memory 1910.

The information processing apparatus 100 is the above-described information processing apparatus.

In this configuration, when the configuration data generation apparatus is turned on, the CPU 1901 executes the boot program stored in the ROM 1902, and loads the OS stored in the HDD 1904 to the RAM 1903. When the application for creating the configuration data 105 is activated, the configuration data generation apparatus functions as a circuit configuration information creation apparatus. The created configuration data 105 is input to, for example, the information processing apparatus 100, and is used in the processes of the present invention.

Second Embodiment

An information processing apparatus according to the second embodiment of the present invention will be described. In the second embodiment, the same reference numerals as those in the first embodiment denote the same parts, and a detailed description thereof will not be repeated.

The first embodiment has described an example in which whether a resource is sufficient or insufficient is determined based on the PE count and a process is assigned. However, if the determination is made based on only the PE count, a process may be assigned to free PEs at distant positions. Such assignment may make it impossible to transfer data between PEs in a desired clock cycle. To solve this problem, in the second embodiment, free PEs are detected, and a process is assigned to free PEs within a reference distance.

[Resource Management Unit]

Figure 9:
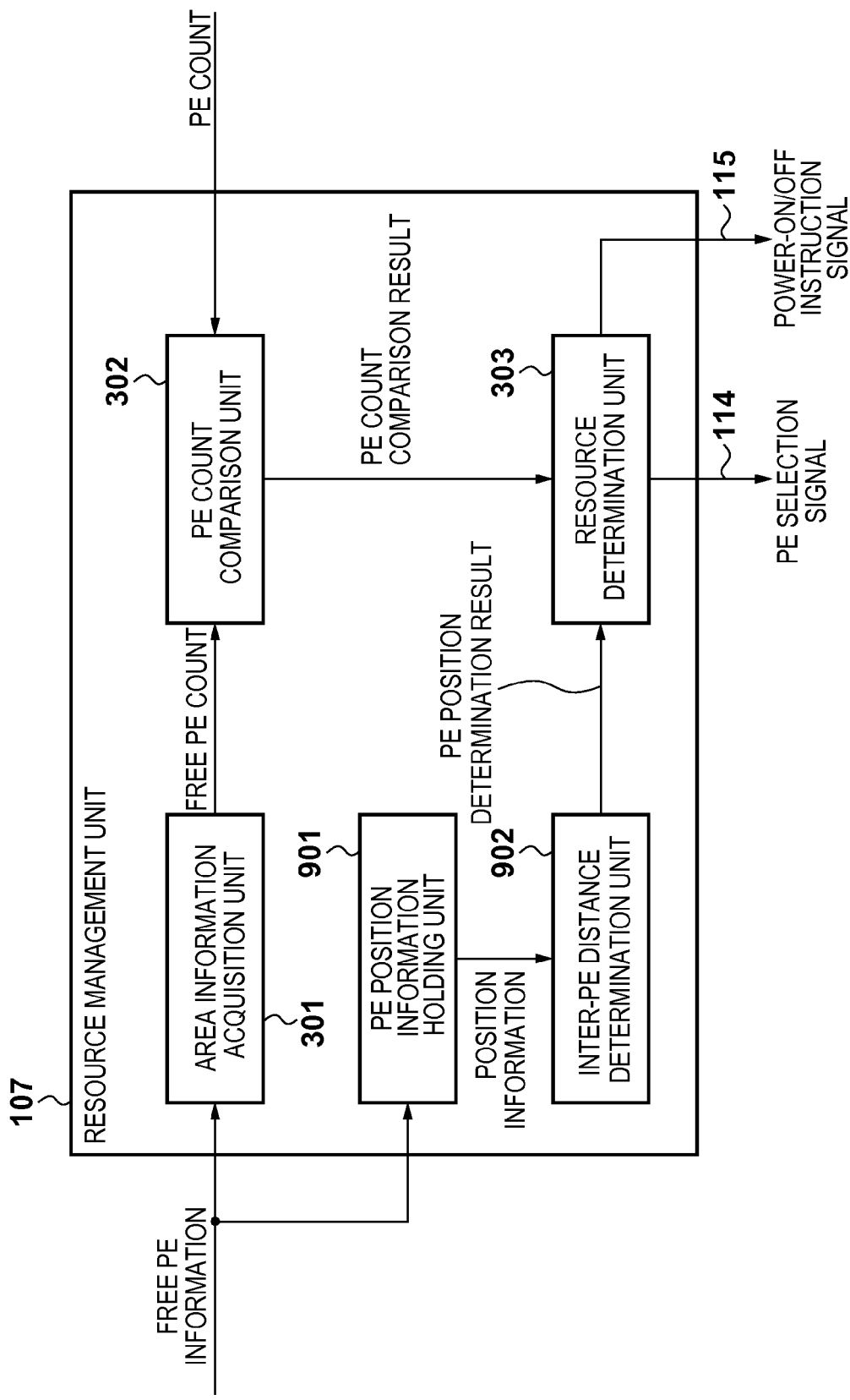
FIG. 9 is a block diagram showing the configuration of a resource management unit according to the second embodiment.

The configuration of a resource management unit 107 according to the second embodiment will be explained with reference to the block diagram of FIG. 9. The resource management unit 107 according to the second embodiment has a configuration in which a PE position information holding unit 901 and inter-PE distance determination unit 902 are added to the configuration of the first embodiment.

Upon receiving free PE information, the PE position information holding unit 901 outputs, to the inter-PE distance determination unit 902, pieces of position information of PEs 102 in a circuit block that are indicated by the free PE information. The inter-PE distance determination unit 902 receives the pieces of position information of free PEs from the PE position information holding unit 901, and outputs a PE position determination result to a resource determination unit 303.

The resource determination unit 303 receives the a PE count comparison result from a PE count comparison unit 302, receives a PE position determination result from the inter-PE distance determination unit 902, and outputs, to a configuration information generation unit 108, a PE selection signal 114 representing the PEs 102 to be used.

[Configuration Operation]

The PE position information holding unit 901 internally holds pieces of position information of the PEs 102, and outputs pieces of position information of the PEs 102 represented by free PE information. Upon receiving the pieces of position information of the free PEs in the circuit block from the PE position information holding unit 901, the inter-PE distance determination unit 902 calculates a distance between the received pieces of position information. When the calculated distance is equal to or smaller than a predetermined distance (reference range), the inter-PE distance determination unit 902 determines that the PEs 102 corresponding to the pieces of position information are adjacent to each other. Note that the predetermined distance is set in the internal register (not shown) of an information processing apparatus 100 by, for example, the user.

The resource determination unit 303 receives the PE count comparison result, and determines whether the free PE count the PE count. The resource determination unit 303 receives the PE position determination result, and determines the adjacent state of free PEs. If the free PE count the PE count, and the resource determination unit 303 determines that the free PEs are adjacent, the resource determination unit 303 outputs, to the configuration information generation unit 108, the PE selection signal 114 representing the use of the free PEs.

The operations of the remaining blocks are the same as those in the first embodiment, and a detailed description thereof will not be repeated.

Configuration Operation Example

When assigning a new process, the information processing apparatus 100 according to the second embodiment acquires pieces of position information of free PEs in a power-supply controlled area, and if the distance between the free PEs falls within the reference range (the free PEs are adjacent), assigns the process. If the distance between the free PEs falls outside the reference range (the free PEs are spaced apart), the information processing apparatus 100 determines that the power-supply controlled area does not have free PEs to which the process can be assigned. The information processing apparatus 100 performs this process for each power-supply controlled area in the power-on state, and detects free PEs to which the process can be assigned. If a power-supply controlled area in the power-on state does not have free PEs to which the process can be assigned, the information processing apparatus 100 assigns the process to free PEs in a power-supply controlled area in the power-off state.

A case in which the number of circuit blocks 103 in a dynamic reconfiguration circuit 101 is two, and a PE count set in configuration data 105 is four will be explained. Assume that both the circuit blocks 103 are in the power-on state, and each circuit block has four free PEs. However, assume that the free PEs in one circuit block 103 are dispersed (spaced apart), and those in the other circuit block 103 are adjacent. The operation of the information processing apparatus 100 in this state will be explained.

Figure 10A:
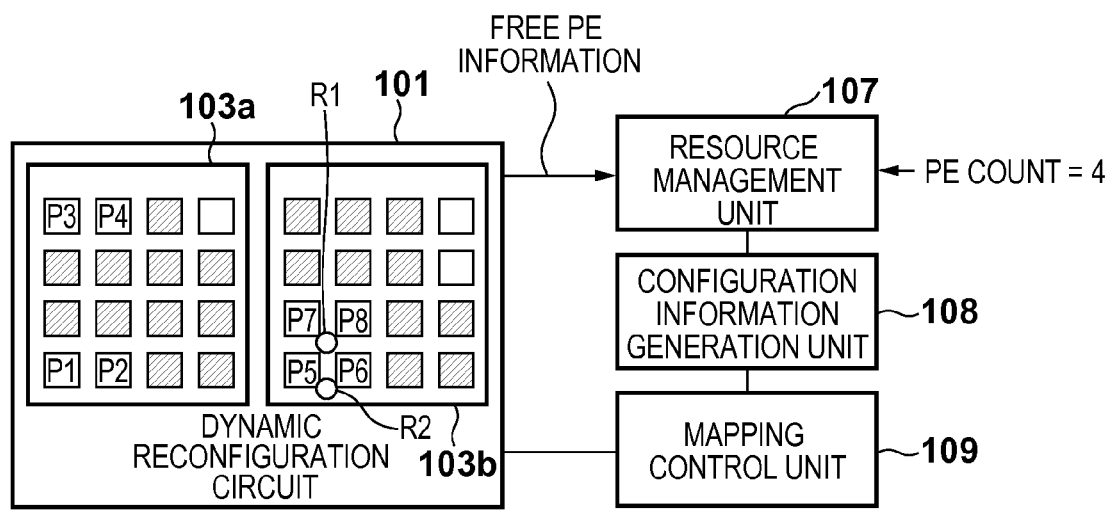
FIGS. 10A and 10B are views exemplifying process assignment states.
Figure 10B:
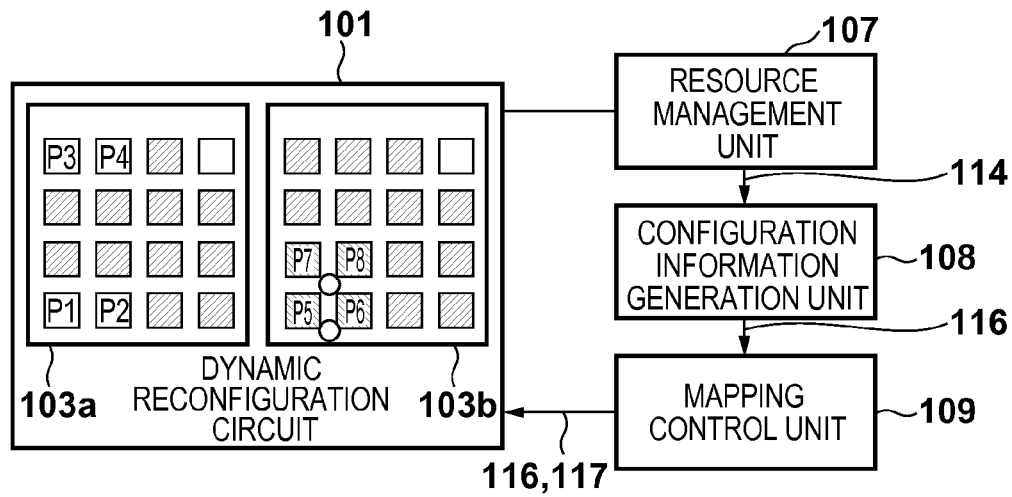

FIGS. 10A and 10B exemplify process assignment states. In FIGS. 10A and 10B, process A and process B are arbitrary arithmetic processes to be executed by the PEs 102. P1 to P8 correspond to the PEs 102, and R1 and R2 correspond to routers 111.

In FIG. 10A, circuit blocks 103a and 103b include four free PEs P1 to P4, and four free PEs P5 to P8, respectively. The resource management unit 107 determines that P1 to P4 in the circuit block 103a are spaced apart from each other, and determines that P5 to P8 in the circuit block 103b are adjacent. Thus, the resource management unit 107 determines to use P5 to P8, and outputs, to the configuration information generation unit 108, the PE selection signal 114 representing the use of P5 to P8.

The configuration information generation unit 108 generates configuration information 116 for using P5 to P8 in the circuit block 103b, and outputs the generated configuration information 116 to a mapping control unit 109. The mapping control unit 109 generates a PE/router selection signal 117 for selecting P5 to P8, R1, and R2, and outputs the generated PE/router selection signal 117 and configuration information 116 to a DMUX 203.

After that, the circuit configuration and input/output of P5 to P8, and the paths of R1 and R2 are set, and execution of process B starts. The process assignment state of the circuit block 103b in the dynamic reconfiguration circuit 101 at the start of process B changes to one shown in FIG. 10B.

When pieces of position information of free PEs output from the PE position information holding unit 901 do not have a positional relationship necessary for an arithmetic process to be executed by the PEs 102, the configuration information generation unit 108 can change the configuration. An example in which the configuration information generation unit 108 reconfigures the configuration data 105 will be explained with reference to FIGS. 11A and 11B. For example, the configuration information generation unit 108 changes configuration information of the original configuration data 105 shown in FIG. 11A, generating reconfiguration data 105' shown in FIG. 11B.

Third Embodiment

An information processing apparatus according to the third embodiment of the present invention will be described. In the third embodiment, the same reference numerals as those in the first and second embodiments denote the same parts, and a detailed description thereof will not be repeated.

The first and second embodiments have described an example in which the present invention is applied when newly executing a single process. However, the present invention is also applicable to a case in which a plurality of processes are newly executed in parallel. PE counts necessary for the respective processes are set in configuration data 105 used when executing a plurality of processes in parallel. When newly executing a plurality of processes in parallel, the processes are assigned to the minimum number of power-supply controlled areas based on the sum of these PE counts.

To achieve this process assignment, a circuit which obtains a PE count necessary to execute a plurality of processes in parallel and calculates the minimum number of power-supply controlled areas necessary to assign the processes is added to a resource management unit 107.

[Resource Management Unit]

The configuration of the resource management unit 107 according to the third embodiment will be explained with reference to the block diagram of FIG. 12.

A PE information acquisition unit 106 acquires PE counts necessary for respective processes that are included in the configuration data 105, and outputs the acquired PE counts to the resource management unit 107. A total PE count calculation unit 1202 receives the PE counts necessary for the respective processes from the PE information acquisition unit 106, adds them, and outputs the total PE count to a minimum number calculation unit 1201.

The minimum number calculation unit 1201 receives a free PE count from an area information acquisition unit 301, receives the total PE count from the total PE count calculation unit 1202, and outputs the minimum number of necessary power-supply controlled areas to a resource determination unit 303. The resource determination unit 303 receives the minimum number from the minimum number calculation unit 1201, and outputs, to a configuration information generation unit 108, a PE selection signal 114 representing PEs 102 to be used.

[Configuration Operation]

The total PE count calculation unit 1202 adds the PE counts necessary for the respective processes that have been received from the PE information acquisition unit 106, calculates the total PE count, and outputs the total PE count to the minimum number calculation unit 1201.

The minimum number calculation unit 1201 holds the total number of PEs 102 included in each power-supply controlled area. Based on the free PE count, the total PE count, and the total number of PEs 102 included in each power-supply controlled area, the minimum number calculation unit 1201 calculates the minimum number of power-supply controlled areas necessary to assign processes. Then, the minimum number calculation unit 1201 outputs the minimum number to the resource determination unit 303.

The resource determination unit 303 compares the minimum number with the number of power-supply controlled areas in the power-on state (to be referred to as an ON area count hereinafter). If the ON area count≥the minimum number, the resource determination unit 303 determines that the processes can be assigned to the PEs 102 in the power-on state, and outputs, to the configuration information generation unit 108, the PE selection signal 114 representing the PEs 102 to be used. If the ON area count<the minimum number, the resource determination unit 303 determines that the processes cannot be assigned to the PEs 102 in the power-on state.

The operations of the remaining blocks are the same as those in the first embodiment, and a detailed description thereof will not be repeated.

Configuration Operation Example

When assigning a plurality of new processes, the information processing apparatus 100 according to the third embodiment acquires PE counts necessary for the respective processes, calculates the total PE count, acquires a free PE count in the power-on state, and calculates, from the total PE count and free PE count, the minimum number of power-supply controlled areas necessary to assign the processes. If the number (ON area count) of power-supply controlled areas in the power-on state is smaller than the minimum number, the information processing apparatus 100 determines that the processes cannot be assigned to free PEs in the power-on state, and assigns the processes to the PEs of power-supply controlled areas in the power-off state.

A case in which the number of circuit blocks 103 in a dynamic reconfiguration circuit 101 is two, the number of processes to be newly executed that is set in configuration data 105 is three (process B, process C, and process D), the PE count of process B is two, the PE count of process C is four, and the PE count of process D is eight will be explained. Assume that one circuit block 103 is in the power-on state, and the other circuit block 103 is in the power-off state. The operation of the information processing apparatus 100 in this state will be explained.

Figure 13:
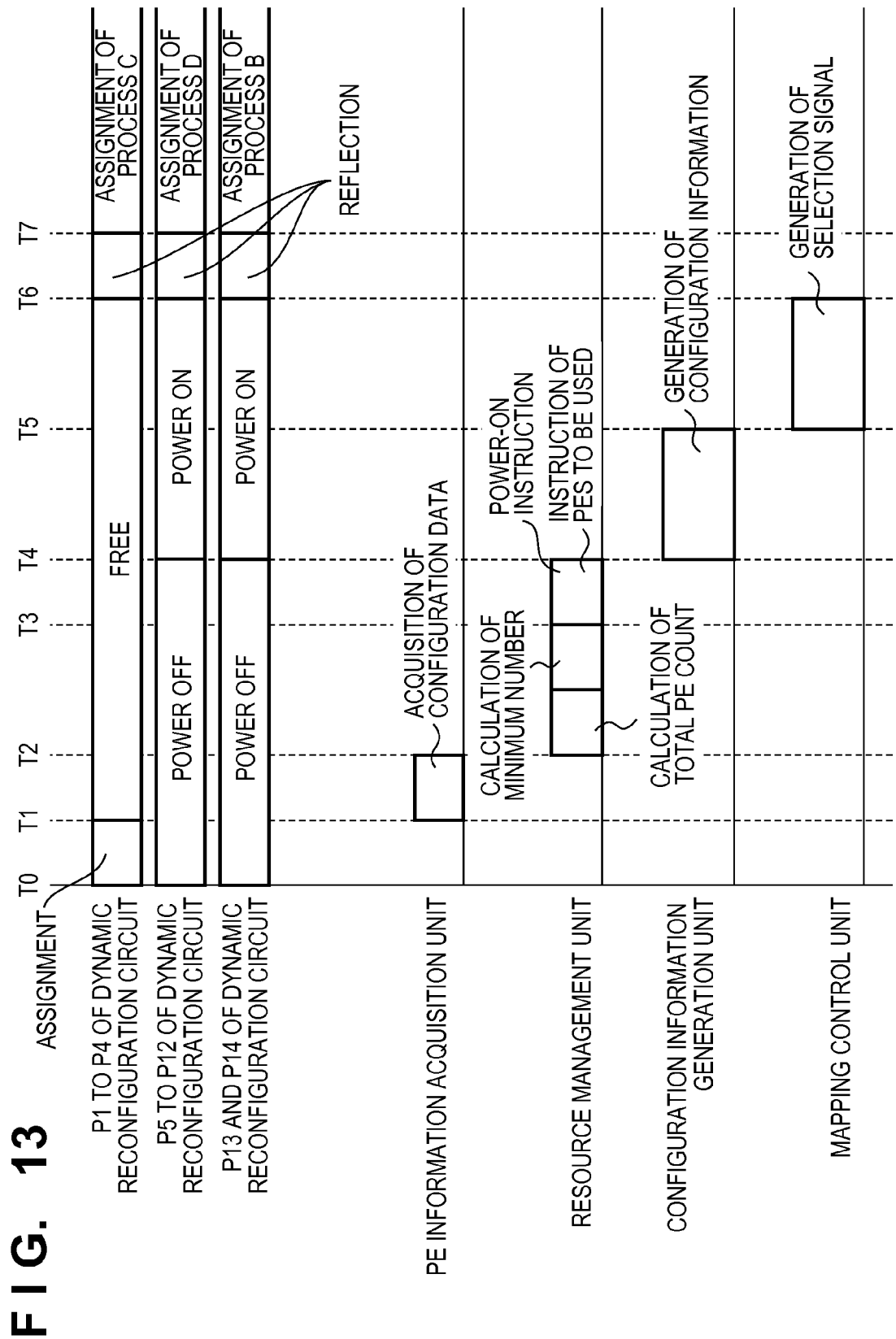
FIG. 13 is a timing chart showing a configuration operation according to the third embodiment.
Figure 14A:
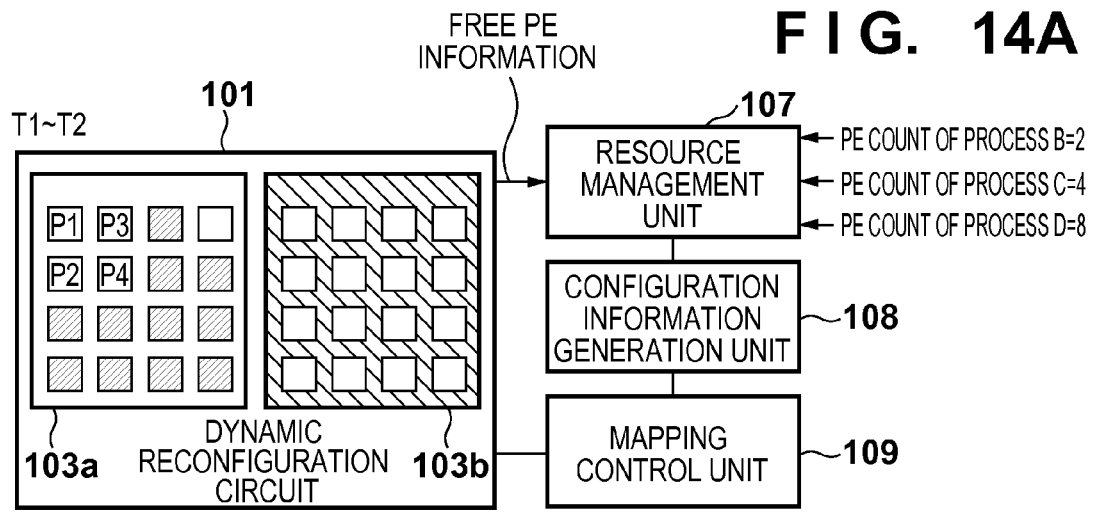
FIGS. 14A to 14C are views exemplifying process assignment states at respective times.
Figure 14B:
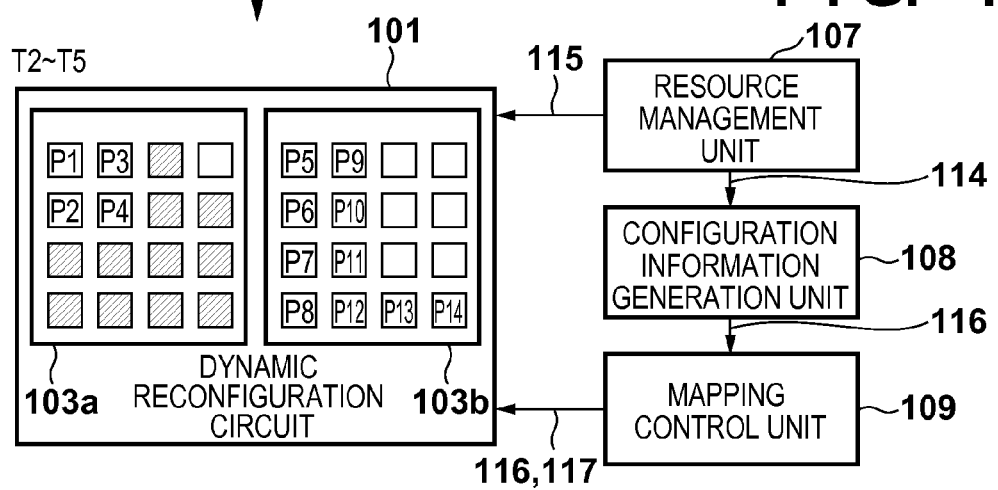
Figure 14C:
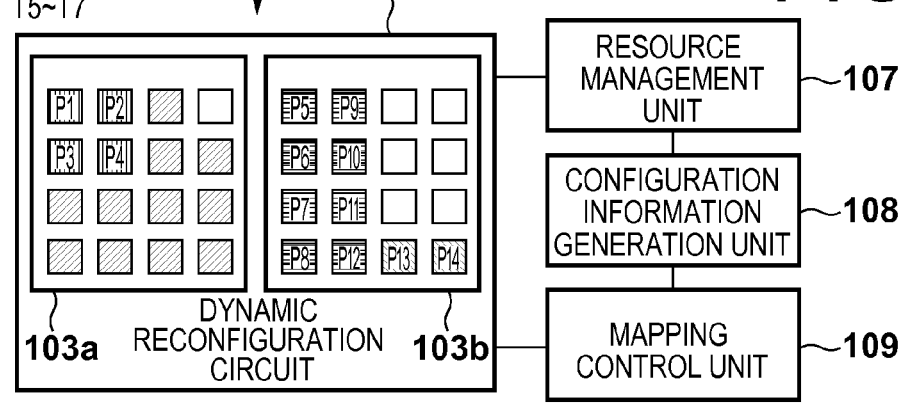

FIG. 13 is a timing chart showing a configuration operation according to the third embodiment. FIGS. 14A to 14C exemplify process assignment states at respective times. In FIGS. 14A to 14C, process A to process D are arbitrary arithmetic processes to be executed by the PEs 102, and P1 to P14 correspond to the PEs 102.

In an interval between time T0 and time T1, a circuit block 103a is in the power-on state, and a circuit block 103b is in the power-off state. At time T1, P1 to P4 in the circuit block 103a complete the process and change to free PEs (FIG. 14A).

In an interval between time T1 and time T2, the PE information acquisition unit 106 receives the configuration data 105 corresponding to process B, process C, and process D, and acquires the PE counts of the respective processes designated by the configuration data 105. The received configuration data 105 designates a PE count of 2 for process B, a PE count of 4 for process C, and a PE count of 8 for process D.

In an interval between time T2 and time T3, the resource management unit 107 receives the PE count (=4) from the PE information acquisition unit 106, receives the PE count=2 for process B, the PE count=4 for process C, and the PE count=8 for process D from the PE information acquisition unit 106, and calculates the total PE count=14. At this time, the free PE count in the power-on state is four, so the resource management unit 107 determines that 10 free PEs in the power-off state need to be used. Since the circuit block 103b in the power-off state has 16 PEs 102, the resource management unit 107 determines that the minimum number of power-supply controlled areas necessary to assign process B, process C, and process D is two, that is, the circuit blocks 103a and 103b.

In an interval between time T3 and time T4, the resource management unit 107 determines that the number (ON area count) of power-supply controlled areas in the power-on state is smaller than the minimum number. The resource management unit 107 outputs, to a power-supply control unit 110, a power-on/off instruction signal 115 for changing the circuit block 103b to the power-on state. Further, the resource management unit 107 outputs, to the configuration information generation unit 108, the PE selection signal 114 representing the use of free PEs in the power-on state and free PEs in the power-off state.

In an interval between time T4 and T5, the power-supply control unit 110 changes the circuit block 103b in the power-off state to the power-on state by controlling a power supply switch 112 in accordance with the power-on/off instruction signal 115 received from the resource management unit 107 (FIG. 14B). In accordance with the PE selection signal 114 received from the resource management unit 107, the configuration information generation unit 108 generates the configuration information 116 for using P1 to P4 in the circuit block 103a and P5 to P14 in the circuit block 103b. The configuration information generation unit 108 outputs the generated configuration information 116 to a mapping control unit 109.

In an interval between time T5 and time T6, the mapping control unit 109 generates a PE/router selection signal 117 for selecting P1 to P14, and outputs the generated PE/router selection signal 117 and configuration information 116 to a DMUX 203.

In an interval between time T6 and time T7, the circuit configuration and input/output of P1 to P14, and the paths of necessary routers 111 are set. At time T6, execution of process B, process C, and process D starts. At time T7, the process assignment states of the circuit blocks 103a and 103b in the dynamic reconfiguration circuit 101 change to those shown in FIG. 14C.

In this fashion, when newly executing a plurality of processes parallelly, the number of power-supply controlled areas to be changed to the power-on state can be minimized to assign a plurality of processes. Even when newly executing a plurality of processes in parallel, an increase in the static power drawn can be suppressed and the charge power drawn can be reduced by preventing unwanted transition of a circuit block from the power-off state to the power-on state.

Fourth Embodiment

An information processing apparatus according to the fourth embodiment of the present invention will be described. In the fourth embodiment, the same reference numerals as those in the first to third embodiments denote the same parts, and a detailed description thereof will not be repeated.

In the above-described embodiments, all the PEs 102 configuring the dynamic reconfiguration circuit 101 are of the same type. However, the dynamic reconfiguration circuit 101 may be configured by different types of processors (heterogeneous multicore). For example, to implement a higher-performance system, the dynamic reconfiguration circuit 101 is sometimes configured by combining general-purpose PEs and application specific PEs. The application specific PEs include, for example, a digital signal processor (DSP) and bit processing processor (BMP). The present invention is applicable to even an information processing apparatus 100 configured by a heterogeneous multicore dynamic reconfiguration circuit 101.

In the heterogeneous multicore, since respective PEs are of different types, PEs of a type suited to the contents of a process to be executed are selected to execute configuration. When executing this configuration, a resource management unit 107 holds information representing the type of PEs 102 included in each power-supply controlled area, and referring to the information to select PEs to be used.

[Dynamic Reconfiguration Circuit]

Figure 15:
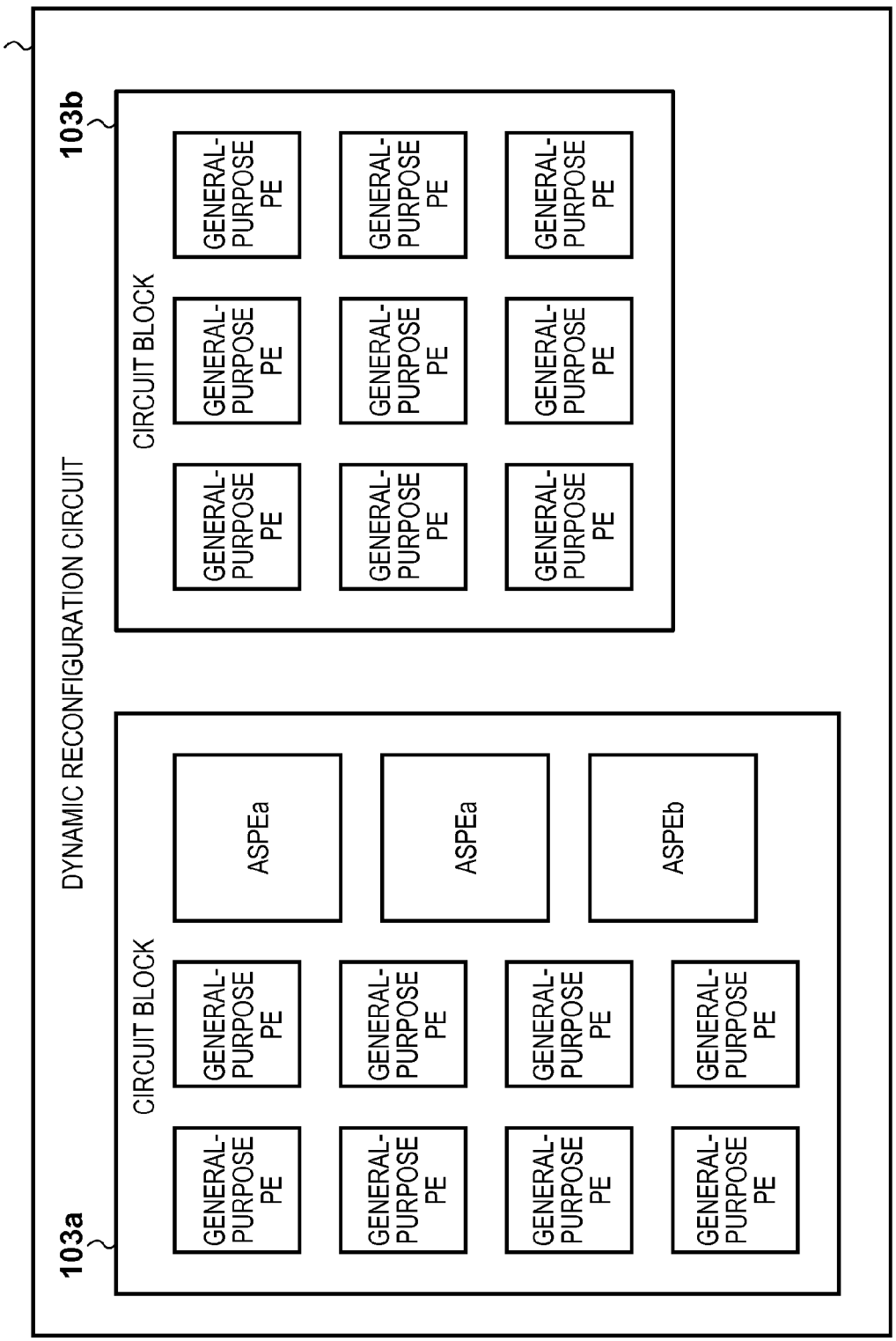
FIG. 15 is a view for explaining the configuration of a dynamic reconfiguration circuit according to the fourth embodiment.

The configuration of the dynamic reconfiguration circuit 101 according to the fourth embodiment will be explained with reference to FIG. 15.

The dynamic reconfiguration circuit 101 includes three types of PEs, that is, general-purpose PEs, application specific PEs (ASPEa) to be used for the first application purpose, and application specific PEs (ASPEb) to be used for the second application purpose. A circuit block 103a includes the three types of general-purpose PEs, ASPEa, and ASPEb, and a circuit block 103b includes only general-purpose PEs.

[Resource Management Unit]

Figure 16:
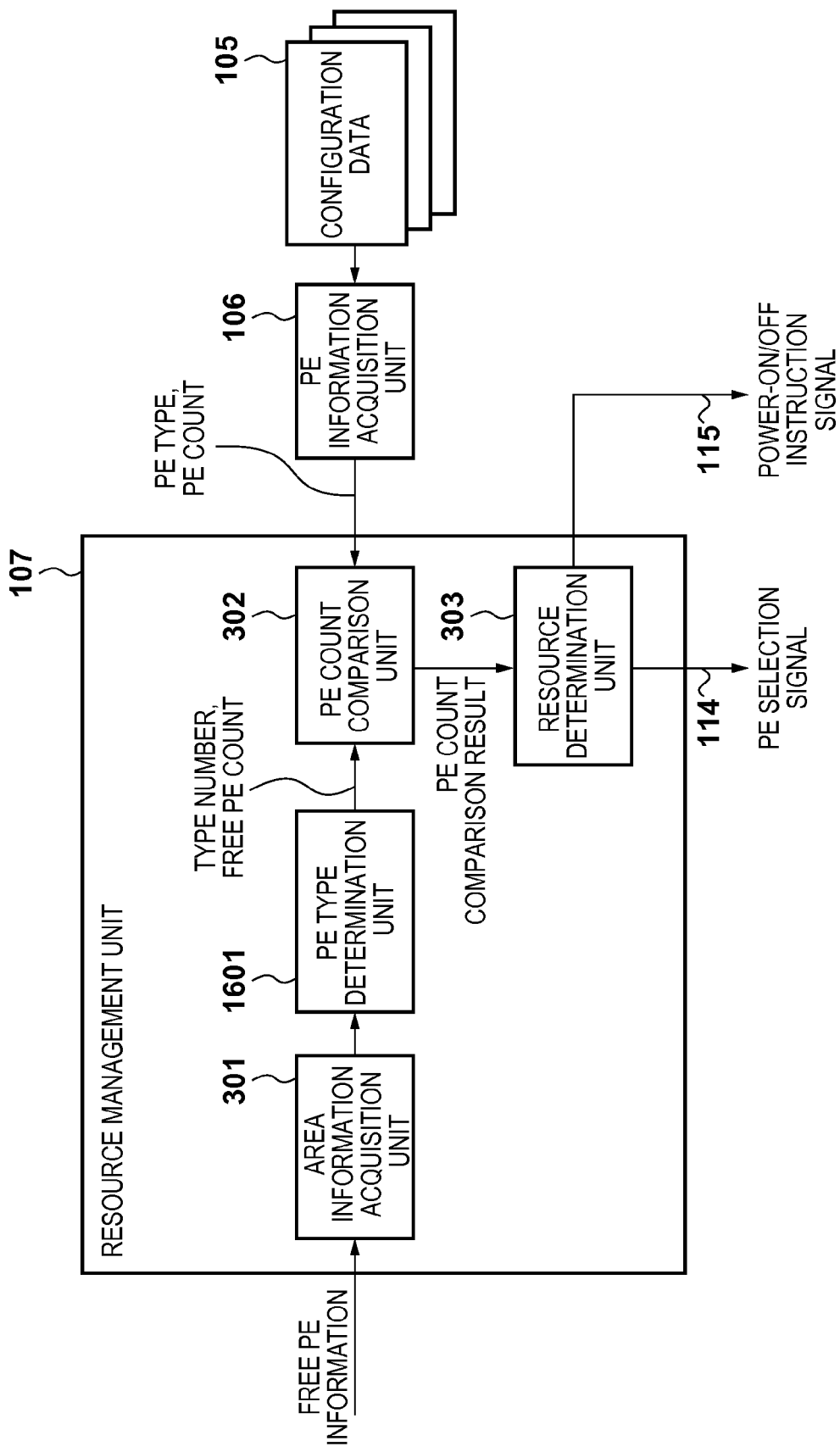
FIG. 16 is a block diagram exemplifying the configurations of a resource management unit and a block which inputs configuration data.

The configurations of a resource management unit 107 and a block which inputs configuration data 105 will be explained with reference to the block diagram of FIG. 16.

A PE information acquisition unit 106 receives the configuration data 105, and outputs, to the resource management unit 107, information representing the type of PE (PE type) and the number of PEs (PE count). The resource management unit 107 receives the PE type and PE count from the PE information acquisition unit 106, and receives free PE information from a PE operating status storage unit 104.

By referring to a register 401 of an area information acquisition unit 301, a PE type determination unit 1601 of the resource management unit 107 outputs, to a PE count comparison unit 302, information representing the number of free PEs (free PE count) of the same type, and the type of free PEs. The PE count comparison unit 302 compares the PE type and PE count received from the PE information acquisition unit 106 with the type number and free PE count received from the PE type determination unit 1601, and outputs the PE count comparison result for each PE type to the resource determination unit 303.

FIG. 17 exemplifies the relationship between the PE type and the type number. FIG. 17 shows an example in which type number "01" is assigned to a general-purpose PE, type number "02" is assigned to ASPEa, and type number "03" is assigned to ASPEb.

The PE type determination unit 1601 holds, as the type numbers shown in FIG. 17, the types of respective PEs 102 included in each circuit block 103. The configuration data 105 designates the type numbers shown in FIG. 17 as PE types.

[Configuration Operation]

When newly mapping a process, the information processing apparatus 100 according to the fourth embodiment determines whether the free PE type and count of a power-supply controlled area in the power-on state satisfy conditions (PE type and count) designated by the configuration data 105. If the information processing apparatus 100 determines that the free PE type and count satisfy the conditions, it assigns the process to the free PEs of the power-supply controlled area in the power-on state. If the information processing apparatus 100 determines that the free PE type and count do not satisfy the conditions, it changes, from the power-off state to the power-on state, a power-supply controlled area necessary to satisfy the conditions, and assigns the process to the PEs.

FIGS. 18A and 18B exemplify process assignment states. In FIGS. 18A and 18B, process A and process B are arbitrary arithmetic processes to be executed by PEs.

In FIG. 18A, the circuit block 103a is in the power-off state. The circuit block 103b is in the power-on state, process A is assigned to three general-purpose PEs in the circuit block 103b, and six general-purpose PEs are free PEs.

The PE information acquisition unit 106 receives the configuration data 105 corresponding to process B, and acquires a PE type and PE count designated by the configuration data 105. The received configuration data 105 designates execution of process B using four general-purpose PEs and two ASPEa.

The resource management unit 107 determines whether the free PE type number and free PE count of the circuit block 103b satisfy conditions (PE type and PE count designated by the configuration data 105). Since the circuit block 103b has six general-purpose PEs as free PEs, but does not include ASPEa, the resource management unit 107 determines that the circuit block 103b does not have free PEs to which process B can be assigned.

Then, the resource management unit 107 determines whether the PE type number and PE count of the circuit block 103a satisfy the conditions. Since The circuit block 103a has six general-purpose PEs and two ASPEa, the resource management unit 107 determines that process B can be assigned to the circuit block 103a. Thus, the resource management unit 107 outputs, to a power-supply control unit 110, a power-on/off instruction signal 115 for changing the circuit block 103a in the power-off state to the power-on state. Further, the resource management unit 107 outputs, to a configuration information generation unit 108, a PE selection signal 114 representing the use of four general-purpose PEs and two ASPEa in the circuit block 103a.

Similar to the first embodiment, the configuration of the circuit block 103a is executed. FIG. 18B shows a process assignment state after assigning process B.

In this manner, the present invention is also applicable to a case in which the dynamic reconfiguration circuit 101 is configured by different types of PEs.

Modification of Embodiments

The method of preferentially assigning a process to PEs in the power-on state by using the configuration data 105 input from the information processing apparatus 100 has been described. However, the present invention is also applicable to a general multiprocessor system which does not input configuration data or inputs it only once.

In the multiprocessor system, the circuit configuration is fixed or can be changed only once upon activation of the system. Even when a plurality of power-supply controlled areas are set in the multiprocessor system, the present invention is also applicable. In the multiprocessor system, a task scheduler sometimes executes assignment of an arithmetic process (task) to respective PEs.

To preferentially assign a process to PEs in the power-on state, as in the present invention, the task scheduler acquires the power supply state of PEs and assigns the process in accordance with the state. By using this method, the present invention can be applied to a general multiprocessor system.

However, in a general multiprocessor system, configuration information cannot be changed in accordance with the shape of an area to which a process is assigned. Thus, when the shape of an area to which a process is assigned does not match one requested by an arithmetic process, the arithmetic process is not assigned.

In the present invention, when a plurality of free PEs to which a process can be assigned exist on the information processing apparatus 100, the priority of process assignment to each PE is not set.

Also, the present invention is applicable to both a case in which the processes of a plurality of programs to be parallelly executed on PEs are dependent on each other and a case in which they are independent of each other.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-170375, filed Jul. 31, 2012, which is hereby incorporated by reference herein in its entirety.

What is claimed is:

1. An information processing apparatus comprising:
a plurality of circuit blocks, each of which comprises a plurality of arithmetic elements;
a power supply controller configured to control power supply to the plurality of circuit blocks individually so as to reduce power consumption due to static power in said plurality of circuit blocks, by power shutdown of each circuit block;
an acquisition unit configured to acquire first information with regard to at least a number of arithmetic element(s) necessary for an arithmetic process, and second information with regard to which at least a number of arithmetic elements are included in circuit blocks that are currently being supplied with power by said power supply controller; and
a management unit configured to determine, based on the first information and the second information, whether a process for implementing the arithmetic process can be assigned to one of the arithmetic elements that are included in circuit blocks that are currently being supplied with power by said power supply controller so as to perform a preferential assign of processes for implementing the arithmetic process to the arithmetic elements included in the circuit blocks.

2. The apparatus according to claim 1, further comprising a generation unit configured to generate, based on the first information, configuration information including configuration information of an internal circuit of said arithmetic element, input/output configuration information of said arithmetic element, and connection information between said arithmetic elements.

3. The apparatus according to claim 2, further comprising a provision unit configured to provide the configuration information to an arithmetic element in accordance with assignment by said management unit.

4. The apparatus according to claim 1, further comprising an obtaining unit configured to obtain a number of arithmetic elements that are free and included in circuit blocks that are currently being supplied with power by said power supply controller, and output the second information representing the number of free arithmetic elements.

5. The apparatus according to claim 1, wherein the first information further represents a type of arithmetic elements necessary for the arithmetic process, and
further comprising a determination unit configured to determine, with regard to arithmetic elements that are free and included in circuit blocks that are currently being supplied with power by said power supply controller, a type of the arithmetic elements and a number of the arithmetic elements of the same type, and output the second information representing the number and type of free arithmetic elements.

6. The apparatus according to claim 1, wherein, in a case in which the process cannot be assigned to arithmetic elements that are included in circuit blocks that are currently being supplied with power by said power supply controller, said management unit instructs said power supply controller to supply power to one of said circuit blocks that are not currently being supplied with power.

7. The apparatus according to claim 1, wherein the second information includes information representing a position of the arithmetic element in the circuit block.

8. The apparatus according to claim 7, wherein said management unit assigns, based on the information representing the position, a process for implementing the arithmetic process, to arithmetic elements, a distance between which in the circuit block falls within a reference range.

9. The apparatus according to claim 1, wherein said management unit calculates, based on the first information and the second information, a minimum number of circuit blocks necessary to execute the arithmetic process.

10. The apparatus according to claim 9, wherein said management unit determines whether a number of circuit blocks which are being supplied with power by said power supply controller is not smaller than a minimum number, and in a case in which the number of circuit blocks which are being supplied with power by said power supply controller is smaller the minimum number, instructs said power supply controller regarding the power supply to a power-shutdown circuit block.

11. The apparatus according to claim 1, wherein each of said arithmetic elements comprises a processor element which sequentially reads out at least one of instruction codes and process data from a memory, and sequentially executes a plurality of arithmetic processes.

12. A method of controlling an information processing apparatus which has a plurality of circuit blocks, each of which comprises a plurality of arithmetic elements, and a power supply controller which individually controls power supply to the plurality of circuit blocks, the method comprising:

using a processor to perform:
acquiring first information with regard to at least a number of arithmetic element(s) necessary for an arithmetic process, and second information with regard to which at least a number of arithmetic elements are included in circuit blocks that are currently being supplied with power by the power supply controller; and determining, based on the first information and the second information, whether a process for implementing the arithmetic process can be assigned to one of the arithmetic elements that are included in circuit blocks that are currently being supplied with power by the power supply controller so as to perform a preferential assign of processes for implementing the arithmetic process to the arithmetic elements included in the circuit blocks, wherein the power supply controller achieves a reduction of power consumption caused by a static power that has occurred in the plurality of circuit blocks, by power shutdown of each circuit block.

13. A non-transitory computer readable medium storing program for causing a computer to perform a method of controlling an information processing apparatus which has a plurality of circuit blocks, each of which comprises a plurality of arithmetic elements, and a power supply controller which individually controls power supply to the plurality of circuit blocks, the method comprising:

acquiring first information with regard to at least a number of arithmetic element(s) necessary for an arithmetic process, and second information with regard to which at least a number of arithmetic elements are included in circuit blocks that are currently being supplied with power by the power supply controller; and determining, based on the first information and the second information, whether a process for implementing the arithmetic process can be assigned to one of the arithmetic elements that are included in circuit blocks that are currently being supplied with power by the power supply controller so as to perform a preferential assign of processes for implementing the arithmetic process to the arithmetic elements included in the circuit blocks, wherein the power supply controller achieves a reduction of power consumption caused by a static power that has occurred in the plurality of circuit blocks, by power shutdown of each circuit block.

* * * * *